United States Patent
Xie et al.

(10) Patent No.: US 9,769,739 B2
(45) Date of Patent: Sep. 19, 2017

(54) CELL DISCOVERY METHOD AND DEVICE

(71) Applicant: ZTE CORPORATION, Shenzhen, Guangdong Province (CN)

(72) Inventors: Feng Xie, Shenzhen (CN); Ying Huang, Shenzhen (CN); Yin Gao, Shenzhen (CN); Lin Chen, Shenzhen (CN)

(73) Assignee: ZTE Corporation (CN)

(\*) Notice: Subject to any disclaimer, the term of this patent is extended or adjusted under 35 U.S.C. 154(b) by 0 days.

(21) Appl. No.: 14/905,546

(22) PCT Filed: May 13, 2014

(86) PCT No.: PCT/CN2014/077341
§ 371 (c)(1),
(2) Date: Jan. 15, 2016

(87) PCT Pub. No.: WO2014/173336
PCT Pub. Date: Oct. 30, 2014

(65) Prior Publication Data
US 2016/0157165 A1    Jun. 2, 2016

(30) Foreign Application Priority Data
Jul. 15, 2013 (CN) .......................... 2013 1 0296132

(51) Int. Cl.
*H04W 48/16* (2009.01)
*H04W 4/02* (2009.01)
*H04W 36/00* (2009.01)

(52) U.S. Cl.
CPC ........... *H04W 48/16* (2013.01); *H04W 4/025* (2013.01); *H04W 36/0083* (2013.01)

(58) Field of Classification Search
CPC .. H04W 36/0083; H04W 48/16; H04W 4/025
See application file for complete search history.

(56) References Cited

U.S. PATENT DOCUMENTS

| | | | |
|---|---|---|---|
| 8,639,265 B1* | 1/2014 | Gauba | H04W 48/12 370/329 |
| 2007/0016346 A1* | 1/2007 | Alanen | G01O 5/06 701/4 |

(Continued)

FOREIGN PATENT DOCUMENTS

| | | |
|---|---|---|
| CN | 101981974 A1 | 2/2011 |
| CN | 102869025 A | 1/2013 |

(Continued)

OTHER PUBLICATIONS

European Search Report issued Apr. 19, 2016 in European Patent Application No. EP 14788337.5.

(Continued)

*Primary Examiner* — Kashif Siddiqui
(74) *Attorney, Agent, or Firm* — Plumsea Law Group, LLC

(57) ABSTRACT

A cell discovery method and device are disclosed, which relates to the field of mobile communication and solves a problem that a small cell discovery process is not timely triggered and the power consumption is greater. The method includes: a network node acquiring location information containing altitude information of a user equipment; and the network node sending measurement configuration related information to the user equipment according to the location information of the user equipment, and instructing the user equipment to execute a corresponding measurement according to the measurement configuration related information. The technical scheme provided in the embodiments of the present invention is applicable to an LTE network, which implements convenient and efficient small cell discovery.

27 Claims, 8 Drawing Sheets

(56) References Cited

U.S. PATENT DOCUMENTS

| | | | |
|---|---|---|---|
| 2008/0108374 A1* | 5/2008 | Xiong | G01S 19/41 |
| | | | 455/456.6 |
| 2010/0187406 A1 | 7/2010 | Van Dalen et al. | |
| 2012/0195290 A1 | 8/2012 | Bienas et al. | |
| 2012/0264446 A1 | 10/2012 | Xie et al. | |
| 2013/0150034 A1 | 6/2013 | Kondo | |
| 2014/0050112 A1 | 2/2014 | Garcia et al. | |

FOREIGN PATENT DOCUMENTS

| | | | |
|---|---|---|---|
| JP | 2013106065 A | 5/2013 | |
| JP | 2014519017 A | 8/2014 | |
| WO | 2009120902 A1 | 10/2009 | |
| WO | 2011037214 A1 | 3/2011 | |
| WO | 2012049813 A1 | 4/2012 | |
| WO | 2012148327 A1 | 11/2012 | |
| WO | 2013005105 A2 | 1/2013 | |
| WO | 2013020522 A1 | 2/2013 | |

OTHER PUBLICATIONS

International Search Report and Written Opinion issued Aug. 29, 2014 in PCT Patent Application No. PCT/CN2014/077341.
Japanese Office Action issued Jan. 24, 2017 for Japanese Patent Application No. 2016-526416.

* cited by examiner

CELL DISCOVERY METHOD AND DEVICE

CROSS-REFERENCE TO RELATED APPLICATION(S)

This application is the U.S. National Phase application of PCT application number PCT/CN2014/077341 having a PCT filing date of May 13, 2014, which claims priority of Chinese patent application 201310296132.9 filed on Jul. 15, 2013, the disclosures of which are hereby incorporated by reference.

TECHNICAL FIELD

The present document relates to the field of mobile communication, and particularly, to a cell discovery method and device.

BACKGROUND OF RELATED ART

With the development of the wireless multimedia services, people's demands for high data rate and user experience are ever increasing, thereby raising higher requirements on the system capacity and coverage of the traditional cellular network. In a traditional LTE cellular network, a macro base station as a unique network element of the access side provides access services for the UE. Moreover, in order to satisfy the user's demand for the higher data rate and improve the spectral efficiency of the cellular network, a low power node (LPN) is introduced and taken as a supplement to the macro base station in the 3GPP to provide the access services for the UE. The LPN has characteristics such as low costs, low power and easy deployment and so on, and there are normally two kinds of deployment scenarios namely hotspot deployment and enhanced coverage, which can effectively enhance the data rate of high-rate data services in indoor or outdoor hotspot areas, and improve the coverage in remote areas or at cell edges. Generally the LPN also can be called as a small base station, including a home evolved node B (HeNB), a picocell (pico), a remote radio unit/remote radio header (RRU/RRH) and a relay node (RN) and so on. And a cell under the small base station is normally called as a small cell.

In order to make the UE obtain the higher data rate and reduce the power consumption of the UE, it is required that the UE can effectively discover an adjacent small base station node in time, so that a network node can timely shunt the UE to an adjacent small base station to obtain the high data rate, and the load of the macro base station is shunted in the meantime, and small base stations in different geographic areas can multiplex same spectrum resources, to greatly improve the spectral efficiency. On the other hand, the power consumption of the UE is also a problem that the user most concerns. After the UE is shunted to the small base station, it is served by a closer small base station, which can save the power consumption of the UE well. Moreover, a large portion of the power consumption of the UE is also reflected in the discovery and measurement of the adjacent cell. Especially in a case that the small base station and the macro base station use different frequency points, it is required to execute an inter-frequency measurement to complete the cell discovery. In the LTE, the base station is required to configure a measurement gap for the UE when the UE executes the inter-frequency measurement, and the communication between the UE and the serving base station is interrupted to measure an inter-frequency cell during the measurement gap. However, inter-frequency carrier frequencies that can be simultaneously measured by the UE are limited, if the number of different frequencies required to be measured is great, more measurement gaps are configured for the UE, and thus the quantity of electricity required to be consumed when the UE executes the inter-frequency measurement is greater. In addition, in the LTE, with respect to a UE in a connected state, an s-measure mechanism can be adopted to control the UE to start/close measurement behaviors for the adjacent cell, including the inter-frequency measurement. The base station can configure an s-measure value for the UE (namely a serving cell RSRP threshold value), and if the serving cell RSRP value of the UE is greater than a threshold value, it is not required to start the measurement on the adjacent cell.

In the hotspot deployment scenario, in order to achieve the higher data rate and spectral efficiency, it is required to densely deploy a large number of small base stations within the area, and the macro base station and the small base stations may adopt different frequency points, and different frequency points also may be adopted between the small base stations. Particularly, indoor deployment scenarios, such as offices and malls and so on, are normally buildings with many floors, the small base stations may be deployed at all the different floors, and working carrier frequencies of the small base stations of the different floors may be not identical, that is, the UE entering the area is required to execute the inter-frequency measurement with respect to a great number of inter-frequency frequency points in order to discover an adjacent small cell, thereby causing a great amount of power consumption of the UE.

Moreover, in the hotspot deployment scenario, the small base station may be deployed close to the macro base station, that is, it is located in a center area of a cell of the macro base station but is not deployed at the edge of the cell of the macro base station. In the case of adopting the s-measure mechanism, when a UE which a macro cell serves is located within a scope of a small cell in the center area of the macro cell, a serving cell RSRP value obtained through the measurement is still better and is most likely greater than the s-measure value, which causes that the measurement on the adjacent cell cannot be timely triggered and started, and then an adjacent small cell cannot be effectively discovered. The adoption of the related s-measure mechanism is not applicable to the small cell discovery in the hotspot area deployment of the small base station.

SUMMARY OF THE INVENTION

The present document provides a cell discovery method and device, which solves a problem that a small cell discovery process is not timely triggered and the power consumption is greater.

A cell discovery method comprises:

a network node acquiring location information containing altitude information of a user equipment; and the network node sending measurement configuration related information to the user equipment according to the location information of the user equipment, and instructing the user equipment to execute a corresponding measurement according to the measurement configuration related information.

Preferably, the network node acquiring the location information containing the altitude information of the user equipment comprises:

the network node voluntarily acquiring the location information of the user equipment; or, the network node acquiring the location information of the user equipment through information reported by the user equipment; or, the network node acquiring the location information of the user equipment through user input information of the user equipment; or, the network node acquiring the location information of the user equipment by retrieving the user input information of the user equipment.

Preferably, before the step of the network node acquiring the location information containing the altitude information of the user equipment, the method further comprises:

the network node instructing the user equipment to execute altitude positioning through an RRC dedicated signaling.

Preferably, the method further comprises:

the network node determining that the user equipment has entered an indoor environment by means of:

the network node receiving a current temperature value sent by the user equipment or indication information of whether the user equipment has entered the indoor environment determined according to the current temperature value and a preset rule; and according to the current temperature value sent by the user equipment or the indication information or horizontal location information of the user equipment, the network node deciding whether the user equipment has entered the indoor environment.

Preferably, the method further comprises:

after determining that the user equipment enters the indoor environment, the network node indicating to the user equipment that the user equipment has entered the indoor environment through the RRC dedicated signaling.

Preferably, the method further comprises:

the network node triggering to execute horizontal positioning on the user equipment based on an event that the user equipment has entered the indoor environment.

Preferably, the network node sending the measurement configuration related information to the user equipment according to the location information of the user equipment comprises:

the network node sending the measurement configuration related information to the user equipment according to the location information of the user equipment and network topology information within a coverage scope of the network node, wherein the network topology information comprises:

information of cells within the coverage scope of the network node and geographical location information of the cells, or, information of WIFI access points within the coverage scope of the network node and geographical location information of the WIFI access points, or, information of D2D network nodes within the coverage scope of the network node and geographical location information of the D2D network nodes.

Preferably, the network node obtains the network topology information within the coverage scope by means of:

the network node obtaining the network topology information by means of configuration; or, the network node obtaining the network topology information through adjacency indications reported by user equipments in combination with executing the reported location information of the user equipment.

Preferably, the network node sending the measurement configuration related information to the user equipment according to the location information of the user equipment and the network topology information within the coverage scope of the network node is:

the network node sending the measurement configuration related information to the user equipment comprehensively according to the horizontal location information and altitude location information of the user equipment, wherein the measurement configuration related information contains any one of the following groups of information:

a first group of information: information of one or a plurality of measurement objects, or, a second group of information: a start indication of a WIFI function module of the user equipment, and/or information of a WIFI access point, or, a third group of information: a start indication of a D2D function module of the user equipment, and/or D2D related measurement configuration information.

Preferably, the D2D related measurement configuration information comprises: resources sent and/or received when the user equipment executes D2D discovery or D2D communication, or identifiers, or information related to sequences.

Preferably, the information of the measurement objects comprises:

information of standards required to be measured, wherein the standards comprise: CDMA2000, E-UTRAN, UTRAN and GERAN, and/or, information of frequency points required to be measured, and/or, information of cells on the frequency points required to be measured, wherein the information of cells comprises physical cell identity information of the cells.

The present document further provides a cell discovery method, which comprises:

a user equipment receiving measurement configuration related information sent by a network node according to location information containing altitude information of the user equipment; and the user equipment executing a corresponding measurement according to the measurement configuration related information.

Preferably, before the step of the user equipment receiving the measurement configuration related information sent by the network node according to the location information containing the altitude information of the user equipment, the method further comprises:

the user equipment performing measurement of altitude positioning, and using a built-in barometer or barometric altimeter of the user equipment to perform barometric pressure measurement to obtain a barometric pressure measurement value;

the user equipment performing calibration on the barometric pressure measurement value according to obtained calibration data to obtain an altitude value corresponding to the barometric pressure measurement value; and the user equipment taking the altitude value as altitude location information, and reporting the altitude location information to the network node.

Preferably, before the step of the user equipment receiving the measurement configuration related information sent by the network node according to the location information of the user equipment, the method further comprises:

the user equipment performing measurement of altitude positioning, and specifically using a built-in barometer or barometric altimeter of the user equipment to perform barometric pressure measurement to obtain a barometric pressure measurement value; and the user equipment taking the barometric pressure measurement value as altitude location information and reporting the altitude location information to the network node, so that the network node performs calibration on the barometric pressure measurement value according to local calibration data to obtain an altitude value corresponding to the barometric pressure measurement value.

Preferably, before the step of the user equipment performing measurement of altitude positioning, the method further comprises:

the user equipment autonomously triggering to execute altitude positioning on the user equipment; or, the user equipment receiving an indication sent by the network node through an RRC dedicated signaling, and triggering to execute the altitude positioning.

Preferably, a triggering event of triggering the measurement of altitude positioning and/or reporting of altitude positioning information of the user equipment comprises that the user equipment has entered an indoor environment, and the altitude positioning information comprises the barometric pressure measurement value and/or the altitude value.

Preferably, the triggering event of triggering the reporting of the altitude positioning information of the user equipment comprises:

a variation amplitude compared between a current barometric pressure measurement value and a last barometric pressure measurement value or between a current altitude measurement value and a last altitude measurement value reaching a preset value;

or, a current barometric pressure measurement value being within a range of preset barometric pressure values or a current altitude measurement value being within a range of preset altitude values.

Preferably, the method further comprises:

the user equipment determining that the user equipment has entered the indoor environment by means of:

the user equipment using a built-in thermometer to perform measurement to obtain a current temperature value, and then determining whether the user equipment has entered the indoor environment according to a preset rule; or, the user equipment determining whether the user equipment has entered the indoor environment according to horizontal location information of the user equipment.

Preferably, the method further comprises:

the user equipment triggering to execute horizontal positioning on the user equipment based on an event that the user equipment has entered the indoor environment.

The present document further provides a cell discovery method, which comprises:

a network node sending measurement configuration related information associated with altitude location information to a user equipment, and instructing the user equipment to execute a corresponding measurement according to an altitude positioning result and the measurement configuration related information.

Preferably, the measurement configuration related information associated with the altitude location information comprises any one of the following groups of information:

a fourth group of information: information of one or a plurality of measurement objects and condition information of triggering a measurement on the measurement objects, a fifth group of information: a start indication of a WIFI function module of the user equipment, and/or information of a WIFI access point, and condition information of triggering a start of the WIFI function module and a measurement on the WIFI access point, a sixth group of information: a start indication of a D2D function module of the user equipment, and/or D2D related measurement configuration information, and condition information of triggering a start of the D2D function module and a measurement related to D2D.

Preferably, the D2D related measurement configuration information comprises:

resources sent and/or received when the user equipment executes D2D discovery or D2D communication, or identifiers, or information related to sequences.

Preferably, the condition information comprises:

a value range of barometric pressure values or a value range of altitude values, or, a threshold value of barometric pressure values or a threshold value of altitude values.

Preferably, the network node sending the measurement configuration related information associated with the altitude location information to the user equipment comprises:

the network node sending the measurement configuration related information associated with the altitude location information to the user equipment according to network topology information within a coverage scope of the network node; or, the network node sending the measurement configuration related information associated with the altitude location information to the user equipment according to the network topology information within the coverage scope of the network node and customary information associated with the user equipment; or, the network node sending the measurement configuration related information associated with the altitude location information to the user equipment according to horizontal location information of the user equipment and the network topology information within the coverage scope of the network node;

wherein the network topology information at least comprises: information of cells within the coverage scope of the network node or information of WIFI access points within the coverage scope of the network node or information of D2D network nodes within the coverage scope of the network node, and geographical location information of the cells or geographical location information of the WIFI access points or geographical location information of the D2D network nodes, the customary information associated with the user equipment is information of a cell or WIFI access point which the user equipment once accessed repeatedly, or information of a cell or WIFI access point which the user equipment is inclined to access, or information of a specific cell or WIFI access point set by a user, or WIFI or D2D tendency information according to statistics or set by the user.

The present document further provides a cell discovery method, which comprises:

a user equipment receiving measurement configuration related information associated with altitude location information sent by a network node; and the user equipment executing a corresponding measurement according to an altitude positioning result and the measurement configuration related information.

Preferably, the user equipment executing the corresponding measurement according to the altitude positioning result and the measurement configuration related information comprises:

the user equipment using a built-in barometer or barometric altimeter to execute altitude positioning; and when determining that the altitude positioning result meets a condition of triggering a measurement on measurement objects in the measurement configuration related information, or a start or measurement related to WIFI or D2D, the user equipment executing a measurement on one or a plurality of measurement objects in the measurement configuration related information or executing a corresponding WIFI measurement or a corresponding D2D measurement, or starting a WIFI related function module or a D2D related function module.

The present document further provides a cell discovery device, which comprises:

a location information acquisition module, configured to: acquire location information containing altitude information of a user equipment; and a configuration module, configured to: send measurement configuration related information to the user equipment according to the location information of the user equipment, and instruct the user equipment to execute a corresponding measurement according to the measurement configuration related information.

Preferably, the location information acquisition module comprises:

a first acquisition unit, configured to: voluntarily acquire the location information of the user equipment;

a second acquisition unit, configured to: acquire the location information of the user equipment through information reported by the user equipment;

a third acquisition unit, configured to: acquire the location information of the user equipment through user input information of the user equipment; and a fourth acquisition unit, configured to: acquire the location information of the user equipment by retrieving the user input information of the user equipment.

Preferably, the device further comprises:

a positioning indication module, configured to: instruct the user equipment to execute altitude positioning through an RRC dedicated signaling.

Preferably, the device further comprises:

an environment decision module, configured to: determine that the user equipment has entered an indoor environment by means of:

receiving a current temperature value sent by the user equipment or indication information of whether the user equipment has entered the indoor environment determined according to the current temperature value and a preset rule, and according to the current temperature value sent by the user equipment or the indication information or horizontal location information of the user equipment, deciding whether the user equipment has entered the indoor environment.

Preferably, the positioning indication module is further configured to: after the environment decision module determines that the user equipment has entered the indoor environment, indicate to the user equipment that the user equipment has entered the indoor environment through the RRC dedicated signaling.

Preferably, the configuration module comprises:

a configuration execution unit, configured to: send the measurement configuration related information to the user equipment according to the location information of the user equipment and network topology information within a coverage scope of the network node, wherein the network topology information comprises:

information of cells within the coverage scope of the network node and geographical location information of the cells, or, information of WIFI access points within the coverage scope of the network node and geographical location information of the WIFI access points, or, information of D2D network nodes within the coverage scope of the network node and geographical location information of the D2D network nodes.

Preferably, the configuration module further comprises:

a topology information acquisition unit, configured to: obtain the network topology information within the coverage scope by means of:

obtaining the network topology information by means of configuration; or, obtaining the network topology information through adjacency indications reported by user equipments in combination with executing the reported location information of the user equipment.

The present document further provides a cell discovery device, which comprises:

a configuration information receiving module, configured to: receive measurement configuration related information sent by a network node according to location information containing altitude information of a user equipment; and a measurement execution module, configured to: execute a corresponding measurement according to the measurement configuration related information.

Preferably, the device further comprises a positioning module, wherein the positioning module comprises:

an altitude measurement unit, configured to: perform measurement of altitude positioning, and use a built-in barometer or barometric altimeter of the user equipment to perform barometric pressure measurement to obtain a barometric pressure measurement value;

a calculation unit, configured to: perform calibration on the barometric pressure measurement value according to obtained calibration data to obtain an altitude value corresponding to the barometric pressure measurement value; and a reporting unit, configured to: take the altitude value as altitude location information, and report the altitude location information to the network node.

Preferably, the reporting unit is further configured to: take the barometric pressure measurement value as altitude location information and report the altitude location information to the network node, so that the network node performs calibration on the barometric pressure measurement value according to local calibration data to obtain an altitude value corresponding to the barometric pressure measurement value.

Preferably, the device further comprises:

a triggering module, configured to: autonomously trigger the positioning module to execute the altitude positioning on the user equipment; or, receive an indication sent by the network node through an RRC dedicated signaling, and trigger the positioning module to execute the altitude positioning according to the indication.

Preferably, the triggering module is further configured to: trigger the measurement of altitude positioning and/or reporting of altitude positioning information of the user equipment when a triggering event is detected, wherein the triggering event comprises that the user equipment has entered an indoor environment, the altitude positioning information comprises the barometric pressure measurement value and/or the altitude value, and the triggering event comprises:

a variation amplitude compared between a current barometric pressure measurement value and a last barometric pressure measurement value or between a current altitude measurement value and a last altitude measurement value reaching a preset value;

or, a current barometric pressure measurement value being within a range of preset barometric pressure values or a current altitude measurement value being within a range of preset altitude values.

Preferably, the device further comprises:

an environment decision module, configured to: determine that the user equipment has entered the indoor environment by means of:

using a built-in thermometer of the user equipment to perform measurement to obtain a current temperature value, and then determining whether the user equipment has entered the indoor environment according to a preset rule; or, determining whether the user equipment has entered the indoor environment according to horizontal location information of the user equipment.

Preferably, the triggering module is further configured to: trigger the positioning module to execute horizontal positioning on the user equipment based on an event that the user equipment has entered the indoor environment;

the positioning module further comprises a horizontal positioning unit, configured to: execute the horizontal positioning on the user equipment.

The present document further provides a cell discovery device, which comprises:

a configuration module, configured to: send measurement configuration related information associated with altitude location information to a user equipment, and instruct the user equipment to execute a corresponding measurement according to an altitude positioning result and the measurement configuration related information.

Preferably, the configuration information sending module comprises:

a first configuration unit, configured to: send the measurement configuration related information associated with the altitude location information to the user equipment according to network topology information within a coverage scope of a network node;

a second configuration unit, configured to: send the measurement configuration related information associated with the altitude location information to the user equipment according to the network topology information within the coverage scope of the network node and customary information associated with the user equipment;

wherein the network topology information at least comprises: information of cells within the coverage scope of the network node or information of WIFI access points within the coverage scope of the network node or information of D2D network nodes within the coverage scope of the network node, and geographical location information of the cells or geographical location information of the WIFI access points or geographical location information of the D2D network nodes, the customary information associated with the user equipment is information of a cell or WIFI access point which the user equipment once accessed repeatedly, or information of a cell or WIFI access point which the user equipment is inclined to access, or information of a specific cell or WIFI access point set by a user, or WIFI or D2D tendency information according to statistics or set by the user.

The present document further provides a cell discovery device, which comprises:

a configuration receiving module, configured to: receive measurement configuration related information associated with altitude location information sent by a network node; and a measurement execution module, configured to: execute a corresponding measurement according to an altitude positioning result and the measurement configuration related information.

Preferably, the measurement execution module comprises:

a measurement unit, configured to: use a built-in barometer or barometric altimeter of a user equipment to execute altitude positioning; and a control unit, configured to: when determining that the altitude positioning result meets a condition of triggering a measurement on measurement objects in the measurement configuration related information or a start or measurement related to WIFI or D2D, execute a measurement on one or a plurality of measurement objects in the measurement configuration related information or execute a corresponding WIFI measurement or a corresponding D2D measurement, or start a WIFI related function module of the user equipment or a D2D related function module of the user equipment.

The embodiments of the present invention provide a cell discovery method and device, a network node sends measurement configuration related information to a UE, and then the UE executes a corresponding measurement according to the measurement configuration related information, which implements convenient and efficient small cell discovery, and solves the problem that the small cell discovery process is not timely triggered and the power consumption is greater.

PREFERRED EMBODIMENTS OF THE INVENTION

Figure 1:
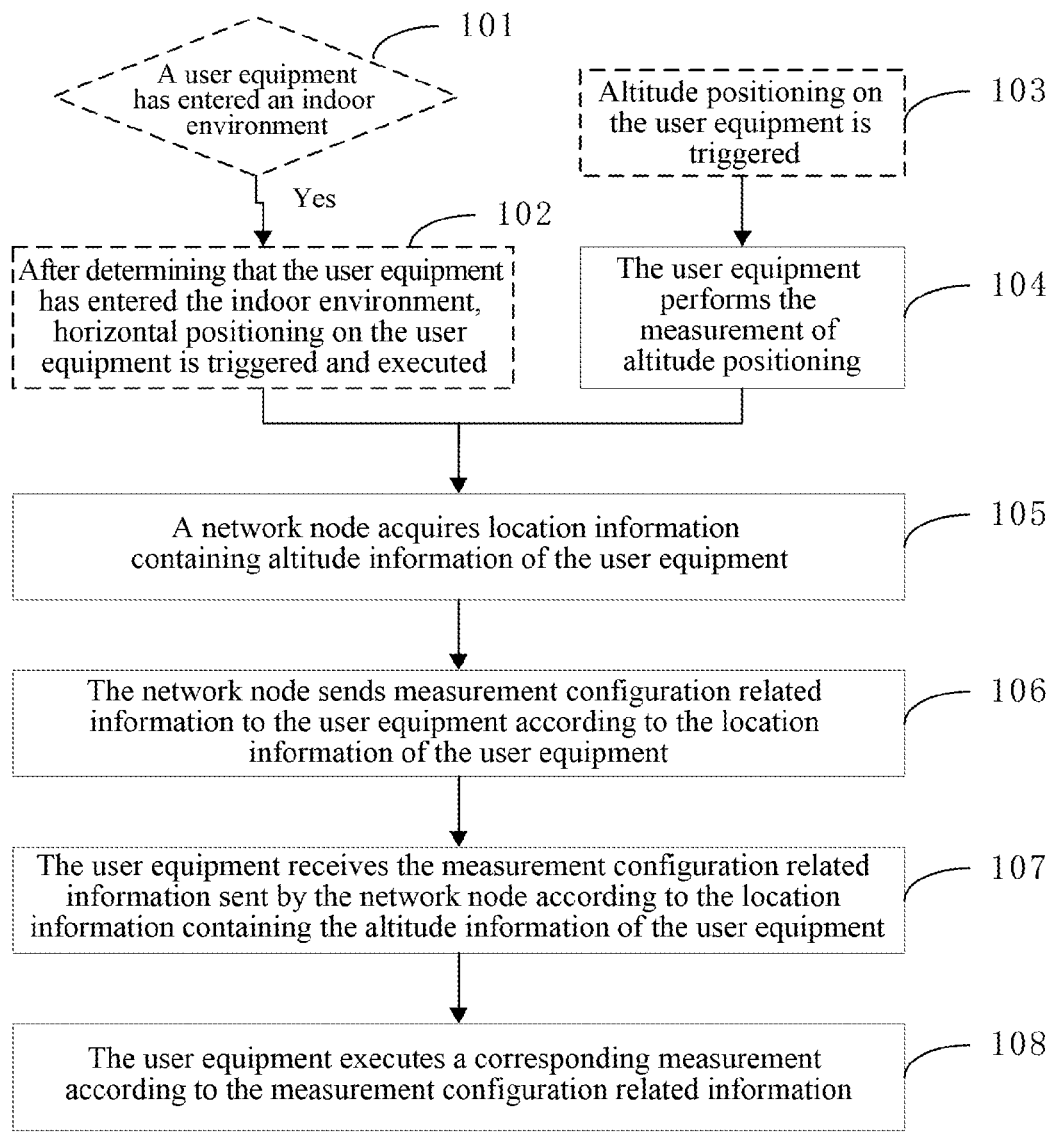
FIG. 1 is a flow chart of a cell discovery method provided in the embodiment 1 of the present invention.
Figure 2:
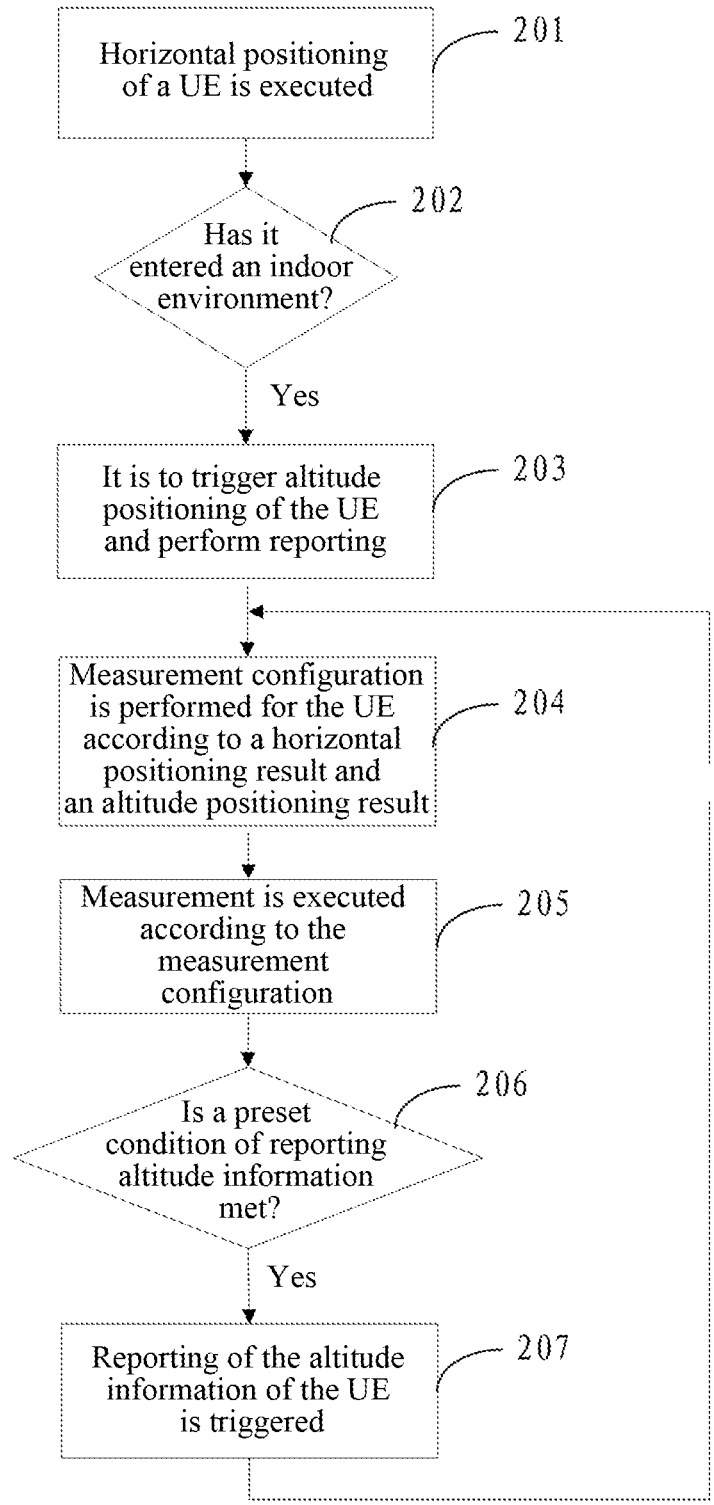
FIG. 2 is a flow chart of a cell discovery method provided in the embodiment 2 of the present invention.

The UE cannot be timely triggered to perform inter-frequency measurement to discover a small cell with the related art, and then the UE cannot be effectively shunted to the small cell, thus the spectral efficiency of the operator's network is affected, and time required for the UE executing a small cell discovery process is longer, and the power consumption of the UE required in the small cell discovery process is greater.

In order to solve the above problem, the embodiments of the present invention provide a cell discovery method and device, a network node obtains location information of a UE, wherein the location information contains horizontal location information and/or altitude location information, and a measurement can be configured for the UE according to the location information of the UE, so that the UE effectively executes the corresponding measurement in time or starts a WIFI function module or a D2D function module to discover an adjacent cell or a WIFI access point or an adjacent UE. Especially with regard to an indoor hotspot coverage scenario in which small cells are densely deployed, the UE can be timely triggered to perform measurement to discover an adjacent small cell with the technical scheme provided in the embodiments of the present invention, and then the network can shunt the UE to the small cell, which can effectively improve the spectral efficiency of the operator's network, and reduce the number of cells or frequency points required to be measured by the UE to the greatest extent, and effectively shorten the time required for the UE executing the small cell discovery process, and reduce the power consumption of the UE required in the small cell discovery process. In the embodiments of the present invention, a low-cost barometer or barometric altimeter or gyroscope-based altimeter is internally installed in the UE, which is used for conveniently and efficiently executing altitude positioning of the UE.

The technical scheme provided in the embodiments of the present invention can be applicable to a cellular communication system, and the communication system at least includes a base station, a user equipment (UE) and a mobility management entity (MME). The user equipment can be a cellular phone, a cordless telephone, a session initiation protocol (SIP) phone, a wireless local loop (WLL) station, a personal digital assistant (PDA), a handheld device with a wireless connection function, the computing equipment or other processing equipment connected to a wireless modem, in the embodiments of the present invention, descriptions will be made with an example of taking the UE as the user equipment. The base station can be used for performing communication with a wireless terminal, and it also can be called as an access point, a node B or other terms. Cellular communications can be performed between the base station and the wireless terminal, and the cellular communications can include GSM communication, CDMA communication, WCDMA communication, TD-SCDMA communication, UMTS communication, LTE communication, and other communications using the cellular network technology.

The embodiments of the present invention will be described in detail in combination with the accompanying drawings below. It should be noted that the embodiments in the present invention and the characteristics in the embodiments can be optionally combined with each other in the condition of no conflict.

Firstly the embodiment 1 of the present invention is described in combination with the accompanying drawing.

The embodiment of the present invention provides a cell discovery method, and a flow of completing the cell discovery with the method is as shown in FIG. 1.

Firstly, horizontal positioning can be performed on the user equipment, and a flow of the horizontal positioning includes the following steps.

In step 101, it is to judge whether the user equipment has entered an indoor environment.

The step can be implemented by the user equipment voluntarily making a judgment, and it also can be implemented by the network node making a judgment.

When the user equipment voluntarily judges whether it has entered the indoor environment, it can be implemented by means of:

the user equipment using a built-in thermometer to perform measurement to obtain a current temperature value, and then determining whether it has entered the indoor environment according to a preset rule; or, the user equipment determining whether the user equipment has entered the indoor environment according to horizontal location information of the user equipment.

When the network node makes the judgment, the network node can determine whether the user equipment has entered the indoor environment by means of:

1. The network node receiving a current temperature value sent by the user equipment or indication information of whether the user equipment has entered the indoor environment determined according to the current temperature value and the preset rule;

2. According to the current temperature value sent by the user equipment or the indication information or the horizontal location information of the user equipment, the network node deciding whether the user equipment has entered the indoor environment.

In step 102, after determining that the user equipment has entered the indoor environment, the horizontal positioning on the user equipment is triggered and executed.

When the user equipment voluntarily judges whether it has entered the indoor environment in the step 101, the user equipment voluntarily triggers to execute the horizontal positioning on the user equipment based on an event that the user equipment has entered the indoor environment.

When the network judges whether the user equipment has entered the indoor environment in the step 101, and after the network node determines that the user equipment has entered the indoor environment, it can indicate to the user equipment that the user equipment has entered the indoor environment through an RRC dedicated signaling, to trigger the horizontal positioning on the user equipment. The user equipment receives the RRC dedicated signaling sent by the network node, and triggers to execute the horizontal positioning on the user equipment based on the event that the user equipment enters the indoor environment.

The step 101 to step 102 are optional steps, that is, in the embodiments of the present invention, the horizontal positioning on the user equipment also can be not performed. Moreover, judging whether the user equipment has entered the indoor environment also can be taken as a triggering event of triggering the measurement of altitude positioning and/or reporting of altitude positioning information of the user equipment.

The process of completing the configuration in combination with location information and performing corresponding measurement will be described below.

In step 103, the altitude positioning on the user equipment is triggered.

In the step, specifically the user equipment can autonomously execute the altitude positioning on the user equipment, and the altitude positioning also can be triggered and executed through an indication sent by the network node to the user equipment through the RRC dedicated signaling.

In step 104, the user equipment performs the measurement of altitude positioning.

The step is specifically using a built-in barometer or barometric altimeter of the user equipment to perform barometric pressure measurement to obtain a barometric pressure measurement value.

In step 105, the network node acquires location information containing altitude information of the user equipment.

In the step, the network node can acquire the location information by means of:

the network node voluntarily acquiring the location information of the user equipment; or, the network node acquiring the location information of the user equipment through information reported by the user equipment; or, the network node acquiring the location information of the user equipment through user input information of the user equipment; or, the network node acquiring the location information of the user equipment by retrieving the user input information of the user equipment.

The network node sends measurement configuration related information to the user equipment according to the location information of the user equipment, and instructs the user equipment to execute a corresponding measurement according to the measurement configuration related information.

In the process of acquiring the location information, there are two interactive modes between the network node and the user equipment, and the two interactive modes will be respectively described below.

Mode 1:

1. The user equipment performs the measurement of altitude positioning, and specifically uses a built-in barometer or barometric altimeter of the user equipment to perform barometric pressure measurement to obtain a barometric pressure measurement value;

2. The user equipment performs calibration on the barometric pressure measurement value according to obtained calibration data to obtain an altitude value corresponding to the barometric pressure measurement value; and 3. The user equipment takes the altitude value as altitude location information, and reports the altitude location information to the network node.

Mode 2:

1. The user equipment performs the measurement of altitude positioning, and specifically uses a built-in barometer or barometric altimeter of the user equipment to perform barometric pressure measurement to obtain a barometric pressure measurement value;

2. The user equipment takes the barometric pressure measurement value as altitude location information and reports the altitude location information to the network node, so that the network node performs calibration on the barometric pressure measurement value according to local calibration data to obtain an altitude value corresponding to the barometric pressure measurement value.

The triggering event of triggering the measurement of altitude positioning and/or reporting of altitude positioning information of the user equipment includes that the user equipment has entered the indoor environment, and the altitude positioning information includes the barometric pressure measurement value and/or the altitude value.

The triggering event of triggering the reporting of the altitude positioning information of the user equipment includes:

a variation amplitude compared between a current barometric pressure measurement value and a last barometric pressure measurement value or between a current altitude measurement value and a last altitude measurement value reaching a preset value;

or, a current barometric pressure measurement value being within a range of preset barometric pressure values or a current altitude measurement value being within a range of preset altitude values.

In step 106, the network node sends the measurement configuration related information to the user equipment according to the location information of the user equipment.

In the step, the network node instructs the user equipment to execute the corresponding measurement according to the measurement configuration related information by sending the measurement configuration related information.

Specifically, the network node sends the measurement configuration related information to the user equipment according to the location information of the user equipment and network topology information within a coverage scope of the network node, and the network topology information includes:

information of cells within the coverage scope of the network node and geographical location information of the cells, or, information of WIFI access points within the coverage scope of the network node and geographical location information of the WIFI access points, or, information of D2D network nodes within the coverage scope of the network node and geographical location information of the D2D network nodes.

The network node obtains the network topology information within the coverage scope by means of:

the network node obtaining the network topology information by means of configuration; or, the network node obtaining the network topology information through adjacency indications reported by user equipments in combination with executing the reported location information of the user equipment.

The network node sending the measurement configuration related information to the user equipment according to the location information of the user equipment and the network topology information within the coverage scope of the network node is specifically:

the network node sending the measurement configuration related information to the user equipment comprehensively according to the horizontal location information and altitude location information of the user equipment, wherein the measurement configuration related information contains any one of the following groups of information:

a first group of information: information of one or a plurality of measurement objects, or, a second group of information: a start indication of a WIFI function module of the user equipment, and/or information of a WIFI access point, or, a third group of information: a start indication of a D2D function module of the user equipment, and/or D2D related measurement configuration information.

Wherein, the D2D related measurement configuration information includes: resources sent and/or received when the user equipment executes D2D discovery or D2D communication, or identifiers, or information related to sequences.

The information of the measurement objects includes:
information of standards required to be measured, wherein the standards include: CDMA2000, E-UTRAN, UTRAN and GERAN, and/or,
information of frequency points required to be measured, and/or,
information of cells on the frequency points required to be measured, wherein the information of cells includes physical cell identity information of the cells.

In step 107, the user equipment receives the measurement configuration related information sent by the network node according to the location information containing the altitude information of the user equipment.

In step 108, the user equipment executes the corresponding measurement according to the measurement configuration related information.

The embodiment 2 of the present invention will be described in combination with the accompanying drawing below.

Figure 3:
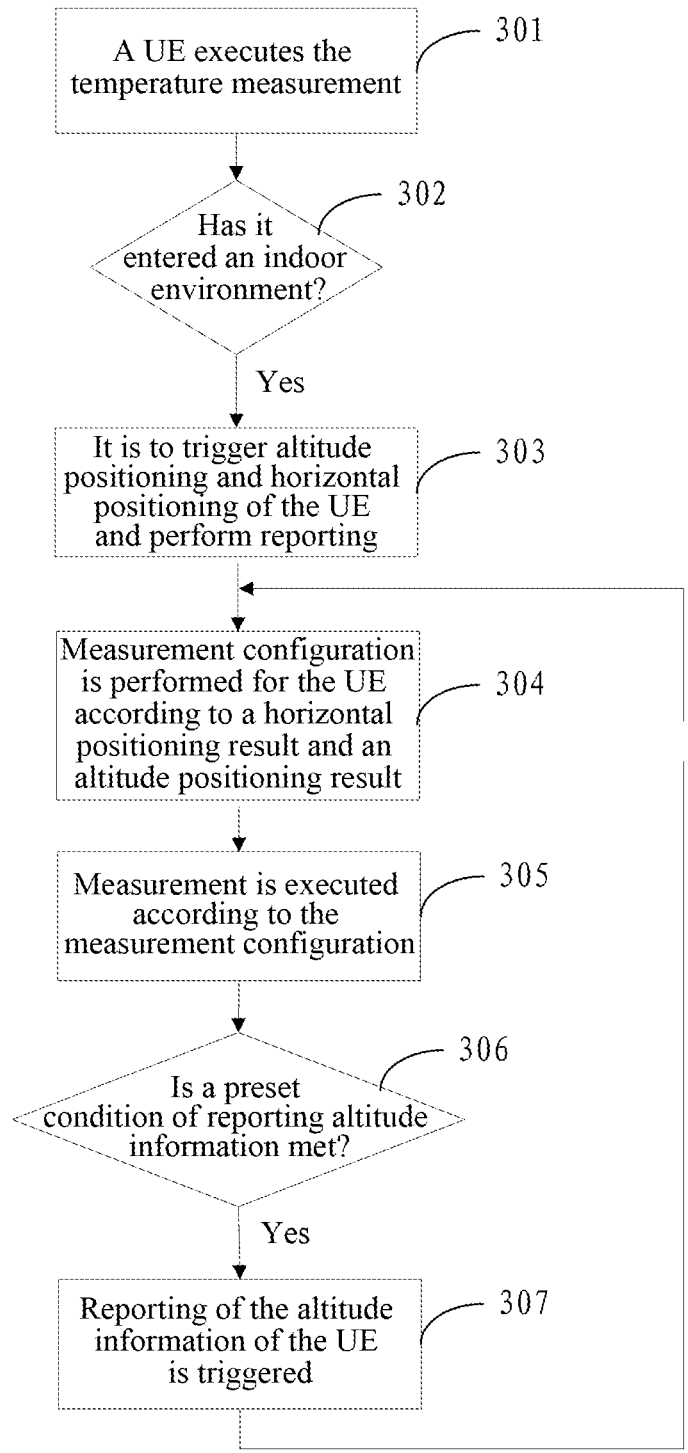
FIG. 3 is a flow chart of a cell discovery method provided in the embodiment 3 of the present invention.

The embodiment of the present invention provides a cell discovery method, and descriptions will be made with an example of taking a base station as a network node and a UE as a user equipment. In the technical scheme provided in the embodiment of the present invention, by means of determining whether the UE enters an indoor environment according to the temperature measurement, the base station configures objects required to be measured for the UE according to a horizontal positioning result and an altitude positioning result in the method, and the flow of controlling the UE to complete the measurement with the cell discovery method provided in the present document is as shown in FIG. 3, and the following steps are included.

In step 201, the horizontal positioning of the UE is executed.

The following methods can be used in the step:
1) A method based on global navigation satellite positioning (GNSS or A-GNSS).
2) Positioning technologies based on the wireless network, including: an enhanced cell identity (E-CID), an OTDOA (downlink observed time difference of arrival) and a UTDOA (uplink observed time difference of arrival).

The above horizontal positioning can be periodically triggered by the UE, or be triggered by a user, or be initiated by a network, for example, it is initiated after the network is informed of a general geographical location of the UE according to a measurement report of the UE.

In step 202, the UE can determine whether it has entered an indoor environment in combination with map information after obtaining a horizontal positioning result, or the base station determines whether the UE has entered the indoor environment in combination with the map information after obtaining horizontal location information of the UE. If the UE has entered the indoor environment, step 203 is executed; and if the UE has not entered the indoor environment, altitude positioning is not triggered, and the current flow ends.

In step 203, if the UE determines whether it has entered the indoor environment, the UE can autonomously trigger to execute the altitude positioning after determining that it has entered the indoor environment; and if the base station determines whether the UE has entered the indoor environment, the base station can trigger the altitude positioning of the UE, and specifically the base station can indicate to the UE through an RRC dedicated signaling.

The UE uses a built-in barometer or barometric altimeter or gyroscope-based altimeter to measure a current barometric pressure value to execute the altitude positioning. The UE reports altitude location information to the base station after completing the measurement. Wherein, the altitude location information can be a barometric pressure value or an altitude value.

If the altitude location information reported by the UE is the altitude value, the UE is required to calibrate the barometric pressure value into a corresponding altitude value according to calibration data before performing reporting. Wherein the UE can obtain the calibration data by means of:
user input; or OTA, or a barometric pressure value and a corresponding altitude value of a serving base station and/or an adjacent base station received from the base station;
if the altitude location information reported by the UE is the barometric pressure value, the base station calibrates the barometric pressure value into a corresponding altitude value according to local calibration data. In addition, the base station also can acquire the location information of the UE though user input information of the UE, or the base station can acquire the location information of the UE by retrieving the user input information.

In step 204, after obtaining the horizontal positioning result and altitude positioning result of the UE, the base station can determine measurement configuration related information of the UE according to network topology information.

Wherein, the network topology information includes: information of cells (frequency points and physical cell identities, etc.) and geographical location information corresponding to the cells, or information of WIFI access points and geographical location information corresponding to the WIFI access points, or D2D network nodes and geographical location information corresponding to the D2D network nodes.

The base station can obtain the network topology information by means of configuration; or the base station also can obtain the network topology information by means of other UEs reporting adjacency indications. Specifically, the base station can record and make statistics of adjacency indication information reported by the other UEs, and obtain the network topology information in combination with the reported location information of the UE.

The base station can send the measurement configuration related information to the UE through the RRC dedicated signaling (e.g., RRC reconfiguration message), and the measurement configuration related information includes:
1) Information of one or a plurality of measurement objects;
specifically, the information of the measurement objects includes standards, information of frequency points and information of cells and so on. Wherein the standards include: CDMA2000, E-UTRAN, UTRAN and GERAN and so on, wherein the information of cells includes physical cell identity information.
2) Or, a start indication of a WIFI function module of the UE, and/or information of a WIFI access point.
3) Or, a start indication of a D2D function module of the UE, and/or D2D related measurement configuration information. Wherein, the D2D related measurement configuration information includes: resources sent and/or received when the UE executes D2D discovery or D2D communication, or identifiers, or information related to sequences.

It should be noted that, the base station also can determine that the UE leaves the indoor environment or leaves a specific cell/WIFI access point/D2D network according to the location information or temperature measurement information of the UE, and thus the measurement configuration related information sent to the UE contains a deletion of the measurement objects, or a close indication of the WIFI function module, or a close indication of the D2D function module.

In step 205, the UE performs measurement on measurement objects required to be measured according to the measurement configuration information sent by the base station, or starts a corresponding WIFI function module or D2D function module, or executes a corresponding WIFI related measurement or D2D related measurement, to discover a corresponding cell or a WIFI access point or an adjacent UE.

In step 206, the UE judges whether a preset condition of reporting altitude information is met according to the altitude positioning measurement of the UE itself. For example, a variation amplitude compared between a current barometric pressure measurement value and a last barometric pressure measurement value reaches a preset value configured by the base station. Or the current barometric pressure measurement value is within a range of preset barometric pressure values configured by the base station. If the preset condition is met, step 207 is executed, and if the preset condition is not met, it returns to the step 205.

In step 207, if the preset condition is met, reporting of the altitude information of the UE is triggered, that is, the UE reports current altitude location information to the base station. Wherein the altitude location information can be a barometric pressure value or an altitude value. If the altitude location information reported by the UE is the altitude value, the UE is required to calibrate the barometric pressure value into a corresponding altitude value according to calibration data before performing reporting.

Wherein the UE can obtain the calibration data by means of: user input; or OTA, or a barometric pressure value and a corresponding altitude value of a serving base station and/or an adjacent base station received from the base station; if the altitude location information reported by the UE is the barometric pressure value, the base station calibrates the barometric pressure value into a corresponding altitude value according to local calibration data. The base station continues to execute the above step 204 after obtaining the altitude information of the UE, which will not be repeated here.

The embodiment 3 of the present invention will be described in combination with the accompanying drawing below.

The embodiment of the present invention provides a cell discovery method, and descriptions will be made with an example of taking a base station as a network node and a UE as a user equipment. In the technical scheme provided in the embodiment of the present invention, by means of determining whether the UE enters an indoor environment according to the temperature measurement, the base station configures objects required to be measured for the UE according to a horizontal positioning result and an altitude positioning result in the method, and the flow of controlling the UE to complete the measurement with the cell discovery method provided in the present invention is as shown in FIG. 3, and the following steps are included.

In step 301, the UE executes the temperature measurement.

In step 302, the UE or the base station judges whether the UE has entered the indoor environment. In a case that the UE executes the judgment, the UE uses a built-in thermometer to measure a temperature value of the current environment, and then determines whether the UE has entered the indoor environment according to a preset rule, for example, the preset rule can be that a current temperature measurement reading and a last temperature reading are compared and a variation amplitude reaches a certain preset value. If a judgment result is not entering the indoor environment, the horizontal positioning or altitude positioning is not triggered, and the current flow ends; and if it is judged that the UE has entered the indoor environment, step 303 is executed.

In a case that the base station executes the judgment, the UE can send the current temperature measurement value or indication information of whether the UE enters the indoor environment determined according to the current temperature value and the preset rule to the base station, which is used for the base station determining whether the UE has entered the indoor environment.

In step 303, if the UE determines whether it has entered the indoor environment, the UE can autonomously trigger to execute the horizontal positioning and/or altitude positioning after determining that it has entered the indoor environment; and if the base station judges whether the UE enters the indoor environment, the base station can trigger the horizontal positioning and/or altitude positioning of the UE, specifically, the base station can indicate to the UE through an RRC dedicated signaling. If the UE is required to execute the horizontal positioning and altitude positioning, it should be noted that an order of the horizontal positioning and the altitude positioning is not limited.

The following methods can be used for the horizontal positioning of the UE:

1) A method based on global navigation satellite positioning (GNSS or A-GNSS).

2) Positioning technologies based on the wireless network, including: an enhanced cell identity (E-CID), an OTDOA (downlink observed time difference of arrival) and a UTDOA (uplink observed time difference of arrival).

The UE uses a built-in barometer or barometric altimeter or gyroscope-based altimeter to measure a current barometric pressure value to execute the altitude positioning. The UE reports altitude location information to the base station after completing the measurement. Wherein, the altitude location information can be a barometric pressure value or an altitude value. If the altitude location information reported by the UE is the altitude value, the UE is required to calibrate the barometric pressure value into a corresponding altitude value according to calibration data before performing reporting. Wherein the UE can obtain the calibration data by means of: user input; or OTA, or a barometric pressure value and a corresponding altitude value of a serving base station and/or an adjacent base station received from the base station; if the altitude location information reported by the UE is the barometric pressure value, the base station calibrates the barometric pressure value into a corresponding altitude value according to local calibration data.

In addition, the base station also can acquire the location information of the UE though user input information of the UE, or the base station can acquire the location information of the UE by retrieving the user input information.

In step 304, after obtaining the horizontal positioning result and altitude positioning result of the UE, the base station can determine measurement configuration related information of the UE according to network topology information. Wherein, the network topology information includes: information of cells (frequency points and physical cell identities, etc.) and geographical location information corresponding to the cells, or information of WIFI access points and geographical location information corresponding to the WIFI access points, or D2D network nodes and geographical location information corresponding to the D2D network nodes. Wherein, the base station can obtain the network topology information by means of configuration; or the base station also can obtain the network topology information by means of other UEs reporting adjacency indications. Specifically, the base station can record and make statistics of adjacency indication information reported by the other UEs, and obtain the network topology information in combination with the reported location information of the UE.

The base station can send the measurement configuration related information to the UE through the RRC dedicated signaling (e.g., RRC reconfiguration message), and the measurement configuration related information includes:

1) Information of one or a plurality of measurement objects; specifically, the information of the measurement objects includes standards, information of frequency points and information of cells and so on. Wherein the standards include: CDMA2000, E-UTRAN, UTRAN and GERAN and so on, wherein the information of cells includes physical cell identity information.

2) Or, a start indication of a WIFI function module of the UE, and/or information of a WIFI access point.

3) Or, a start indication of a D2D function module of the UE, and/or D2D related measurement configuration information. Wherein, the D2D related measurement configuration information includes: resources sent and/or received when the UE executes D2D discovery or D2D communication, or identifiers, or information related to sequences.

It should be noted that, the base station also can determine that the UE leaves the indoor environment or leaves a specific cell/WIFI access point/D2D network according to the location information or temperature measurement information of the UE, and thus the measurement configuration related information sent to the UE contains a deletion of the measurement objects, or a close indication of the WIFI function module, or a close indication of the D2D function module.

In step 305, the UE performs measurement on measurement objects required to be measured according to the measurement configuration information sent by the base station, or starts a corresponding WIFI function module or D2D function module, or executes a corresponding WIFI related measurement or D2D related measurement, to discover a corresponding cell or a WIFI access point or an adjacent UE.

In step 306, the UE judges whether a preset condition of reporting altitude information is met according to the altitude positioning measurement of the UE itself. For example, a variation amplitude compared between a current barometric pressure measurement value and a last barometric pressure measurement value reaches a preset value configured by the base station. Or, the current barometric pressure measurement value is within a range of preset barometric pressure values configured by the base station. If the reporting condition is not met, it returns to the step 305.

In step 307, if the preset condition is met, reporting of the altitude information of the UE is triggered, that is, the UE reports current altitude location information to the base station. Wherein the altitude location information can be a barometric pressure value or an altitude value. If the altitude location information reported by the UE is the altitude value, the UE is required to calibrate the barometric pressure value into a corresponding altitude value according to calibration data before performing reporting. Wherein the UE can obtain the calibration data by means of: user input; or OTA, or a barometric pressure value and a corresponding altitude value of a serving base station and/or an adjacent base station received from the base station; if the altitude location information reported by the UE is the barometric pressure value, the base station calibrates the barometric pressure value into a corresponding altitude value according to local calibration data. The base station continues to execute the above step 304 after obtaining the altitude information of the UE, which will not be repeated here.

The embodiment 4 of the present invention will be described in combination with the accompanying drawing below.

Figure 4:
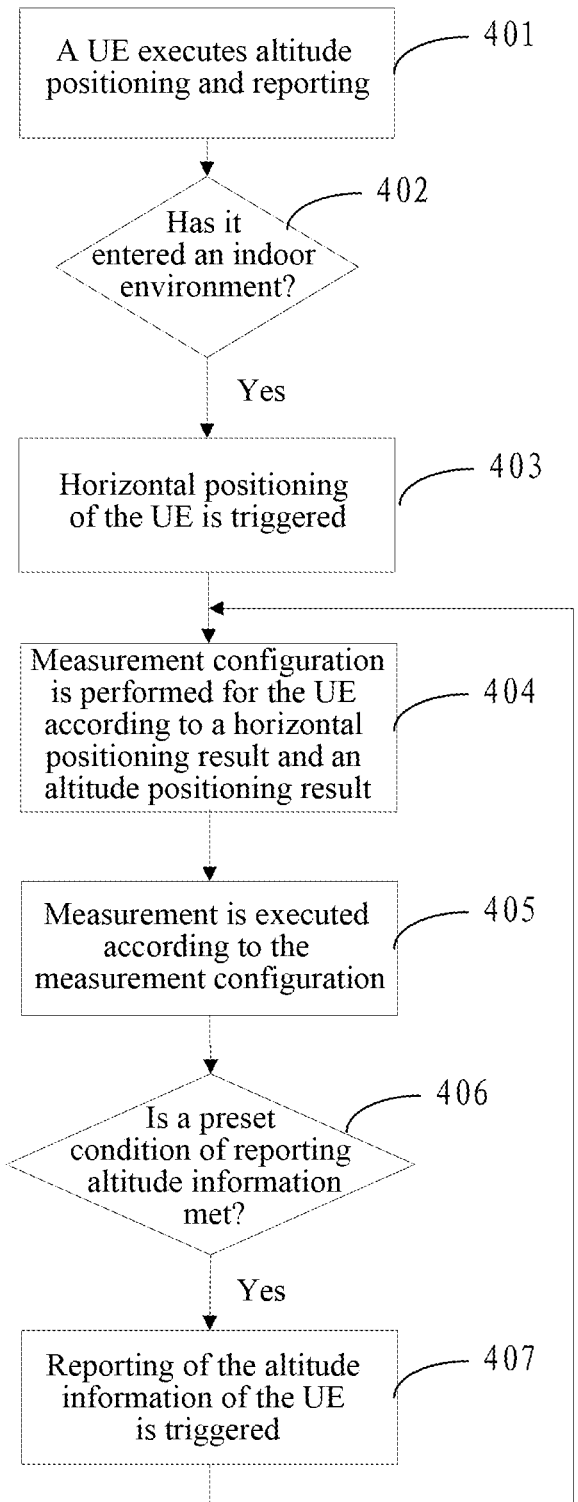
FIG. 4 is a flow chart of a cell discovery method provided in the embodiment 4 of the present invention.

The embodiment of the present invention provides a cell discovery method, and descriptions will be made with an example of taking a base station as a network node and a UE as a user equipment. In the technical scheme provided in the embodiment of the present invention, the base station configures objects required to be measured for the UE according to a horizontal positioning result and an altitude positioning result, and the flow of controlling the UE to complete the measurement with the cell discovery method provided in the embodiment of the present invention is as shown in FIG. 4, and the following steps are included.

In step 401, the UE executes the altitude positioning and reporting. Specifically, the UE uses a built-in barometer or barometric altimeter or gyroscope-based altimeter to measure a current barometric pressure value to execute the altitude positioning. The UE can report altitude location information to the base station after completing the measurement. Wherein, the altitude location information can be a barometric pressure value or an altitude value. The UE can periodically execute the altitude positioning and reporting, and it also can trigger the altitude positioning and reporting based on an event or periodically execute the altitude positioning and reporting based on event triggering. For example, a triggering event can be that a variation amplitude compared between a current barometric pressure measurement value and a last barometric pressure measurement value reaches a preset value; or, the current barometric pressure measurement value is within a range of preset barometric pressure values.

If the altitude location information reported by the UE is the altitude value, the UE is required to calibrate the barometric pressure value into a corresponding altitude value according to calibration data before performing reporting. Wherein the UE can obtain the calibration data by means of: user input; or OTA, or a barometric pressure value and a corresponding altitude value of a serving base station and/or an adjacent base station received from the base station; if the altitude location information reported by the UE is the barometric pressure value, the base station calibrates the barometric pressure value into a corresponding altitude value according to local calibration data.

In step 402, the UE can determine whether it has entered an indoor environment according to a preset rule, or user input information or other positioning results after obtaining an altitude positioning result. Or the base station determines whether the UE has entered the indoor environment according to the preset rule and/or a general location of the UE after obtaining the altitude location information of the UE. The step is an optional step. If the UE has entered the indoor environment, step 403 is executed; and if the UE does not enter the indoor environment, horizontal positioning is not triggered, and the current flow ends.

In step 403, if the UE determines whether it enters the indoor environment, the UE can autonomously trigger to execute the horizontal positioning after determining that it enters the indoor environment; and if the base station judges whether the UE has entered the indoor environment, the base station can trigger the horizontal positioning of the UE, and specifically, the base station can indicate to the UE through an RRC dedicated signaling.

The following methods can be used for executing the horizontal positioning of the UE:

1) A method based on global navigation satellite positioning (GNSS or A-GNSS).

2) Positioning technologies based on the wireless network, including: an enhanced cell identity (E-CID), an OTDOA (downlink observed time difference of arrival) and a UTDOA (uplink observed time difference of arrival).

In addition, the base station also can acquire the location information of the UE though the user input information of the UE, or the base station can acquire the location information of the UE by retrieving the user input information.

In step 404, after obtaining the horizontal positioning result and altitude positioning result of the UE, the base station can determine measurement configuration related information of the UE according to network topology information. Wherein, the network topology information includes: information of cells (frequency points and physical cell identities, etc.) and geographical location information corresponding to the cells, or information of WIFI access points and geographical location information corresponding to the WIFI access points, or D2D network nodes and geographical location information corresponding to the D2D network nodes. Wherein, the base station can obtain the network topology information by means of configuration; or the base station also can obtain the network topology information by means of other UEs reporting adjacency indications. Specifically, the base station can record and make statistics of adjacency indication information reported by the other UEs, and obtain the network topology information in combination with the reported location information of the UE.

The base station can send the measurement configuration related information to the UE through the RRC dedicated signaling (e.g., RRC reconfiguration message), and the measurement configuration related information includes:

1) Information of one or a plurality of measurement objects; specifically, the information of the measurement objects includes standards, information of frequency points and information of cells and so on. Wherein the standards include: CDMA2000, E-UTRAN, UTRAN and GERAN and so on, wherein the information of cells includes physical cell identity information.

2) Or, a start indication of a WIFI function module of the UE, and/or information of a WIFI access point.

3) Or, a start indication of a D2D function module of the UE, and/or D2D related measurement configuration information. Wherein, the D2D related measurement configuration information includes: resources sent and/or received when the UE executes D2D discovery or D2D communication, or identifiers, or information related to sequences.

It should be noted that, the base station also can determine that the UE leaves the indoor environment or leaves a specific cell/WIFI access point/D2D network according to the location information or temperature measurement information of the UE, and thus the measurement configuration related information sent to the UE contains a deletion of the measurement objects, or a close indication of the WIFI function module, or a close indication of the D2D function module.

In step 405, the UE performs measurement on measurement objects required to be measured according to the measurement configuration information sent by the base station, or starts a corresponding WIFI function module or D2D function module, or executes a corresponding WIFI related measurement or D2D related measurement, to discover a corresponding cell or a WIFI access point or an adjacent UE.

In step 406, the UE judges whether a preset condition of reporting altitude information is met according to the altitude positioning measurement of the UE itself. For example, a variation amplitude compared between a current barometric pressure measurement value and a last barometric pressure measurement value reaches a preset value configured by the base station; or, the current barometric pressure measurement value is within a range of preset barometric pressure values configured by the base station. If the preset condition is not met, it returns to the step 405.

In step 407, if the preset condition is met, reporting of the altitude information of the UE is triggered, that is, the UE reports current altitude location information to the base station. Wherein the altitude location information can be a barometric pressure value or an altitude value. If the altitude location information reported by the UE is the altitude value, the UE is required to calibrate the barometric pressure value into a corresponding altitude value according to calibration data before performing reporting. Wherein the UE can obtain the calibration data by means of: user input; or OTA, or a barometric pressure value and a corresponding altitude value of a serving base station and/or an adjacent base station received from the base station; if the altitude location information reported by the UE is the barometric pressure value, the base station calibrates the barometric pressure value into a corresponding altitude value according to local calibration data. The base station continues to execute the above step 404 after obtaining the altitude information of the UE, which will not be repeated here.

The embodiment 5 of the present invention will be described in combination with the accompanying drawing below.

Figure 5:
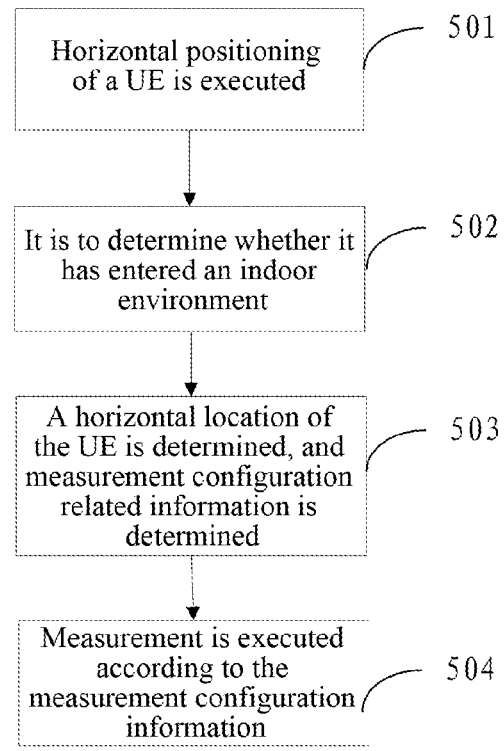
FIG. 5 is a flow chart of a cell discovery method provided in the embodiment 5 of the present invention.

The embodiment of the present invention provides a cell discovery method, and descriptions will be made with an example of taking a base station as a network node and a UE as a user equipment. In the technical scheme provided in the embodiment of the present invention, by means of determining whether the UE enters an indoor environment according to horizontal location information of the UE, the base station configures measurement objects and associated altitude information for the UE according to a horizontal positioning result of the UE, and the flow of completing control on the measurement of the UE with the method is as shown in FIG. 5, and the following steps are included.

In step 501, horizontal positioning of the UE is executed, and the following methods can be used:

1) A method based on global navigation satellite positioning (GNSS or A-GNSS).

2) Positioning technologies based on the wireless network, including: an enhanced cell identity (E-CID), an OTDOA (downlink observed time difference of arrival) and a UTDOA (uplink observed time difference of arrival).

The above horizontal positioning can be periodically triggered by the UE, or be triggered by a user, or be initiated by a network, for example, it is initiated after the network is informed of a general geographical location of the UE according to a measurement report of the UE.

In step 502, the base station determines whether the UE has entered an indoor environment in combination with map information after obtaining the horizontal location information of the UE. Or the UE can determine whether it enters the indoor environment in combination with the map information after obtaining the horizontal positioning result. If the UE judges that the UE itself enters the indoor environment, the horizontal location information can be reported to the base station. If the UE does not enter the indoor environment, it continues to perform judgment.

In addition, the base station also can acquire the location information of the UE though user input information of the UE, or the base station can acquire the location information of the UE by retrieving the user input information.

In step 503, if the UE or the base station judges that the UE enters the indoor environment, the base station determines a horizontal location of the UE in combination with network topology information after obtaining the horizontal location information of the UE, and determines measurement configuration related information of the UE. Wherein, the network topology information includes: information of cells (frequency points and physical cell identities, etc.) and geographical location information corresponding to the cells, or information of WIFI access points and geographical location information corresponding to the WIFI access points, or D2D network nodes and geographical location information corresponding to the D2D network nodes. Wherein, the base station can obtain the network topology information by means of configuration; or the base station also can obtain the network topology information by means of other UEs reporting adjacency indications. Specifically, the base station can record and make statistics of adjacency indication information reported by the other UEs, and obtain the network topology information in combination with the reported location information of the UE.

The base station can send the measurement configuration related information to the UE through an RRC dedicated signaling (e.g., RRC reconfiguration message). Specifically, the measurement configuration related information includes:

1) Information of one or a plurality of measurement objects, and/or altitude values or barometric pressure values corresponding to the measurement objects. Wherein, the information of the measurement objects includes: standards, frequency points and physical cell identities and so on. Wherein the standards include: CDMA2000, E-UTRAN, UTRAN and GERAN and so on.

2) Or, a start indication of a WIFI function module of the UE, and/or information of a WIFI access point, and/or an altitude value or a barometric pressure value corresponding to the information of the WIFI access point.

3) Or, a start indication of a D2D function module of the UE, and/or D2D related measurement configuration information, and/or an altitude value or a barometric pressure value corresponding to the D2D related measurement configuration information. Wherein, the D2D related measurement configuration information includes: resources sent and/or received when the UE executes D2D discovery or D2D communication, or identifiers, or information related to sequences.

It should be noted that, the base station also can determine that the UE leaves the indoor environment or leaves a specific cell/WIFI access point/D2D network according to the location information or temperature measurement information of the UE, and thus the measurement configuration related information sent to the UE contains a deletion of the measurement objects, or a close indication of the WIFI function module, or a close indication of the D2D function module.

In step 504, the UE determines measurement objects required to be measured according to the measurement configuration related information sent by the base station and an altitude positioning result, and executes a corresponding measurement, or starts a corresponding WIFI function module or D2D function module, or executes a corresponding WIFI related measurement or D2D related measurement, to discover a corresponding cell or a WIFI access point or an adjacent UE. For example, when the measurement configuration related information contains the information of one or a plurality of measurement objects and the altitude values or barometric pressure values corresponding to the measurement objects, the UE determines one or a plurality of measurement objects required to be measured corresponding to the obtained measurement values according to the barometric pressure values or altitude values obtained through measurement by a built-in barometer or barometric altimeter or gyroscope-based altimeter and the measurement configuration related information, and then executes the corresponding measurement on the measurement objects required to be measured.

The embodiment 6 of the present invention will be described in combination with the accompanying drawing below.

Figure 6:
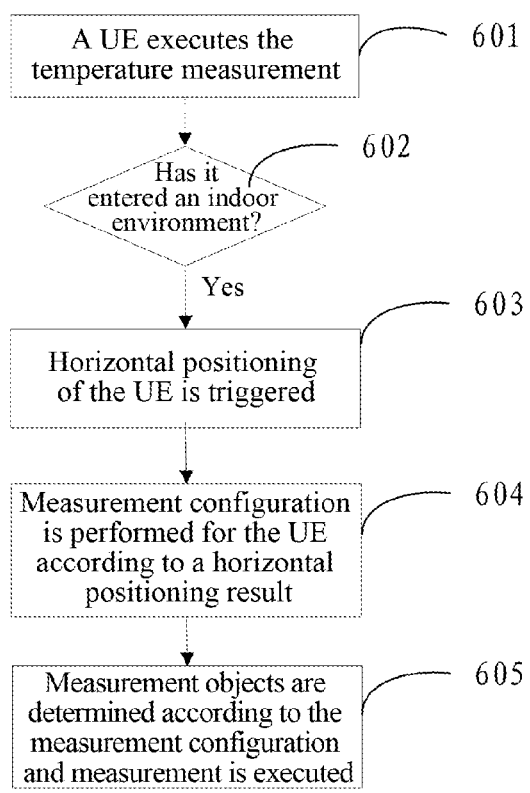
FIG. 6 is a flow chart of a cell discovery method provided in the embodiment 6 of the present invention.

The embodiment of the present invention provides a cell discovery method, and descriptions will be made with an example of taking a base station as a network node and a UE as a user equipment. In the technical scheme provided in the embodiment of the present invention, by means of determining whether the UE enters an indoor environment according to the temperature measurement, the base station configures objects required to be measured for the UE according to a horizontal positioning result, and the flow of controlling the UE to complete the measurement with the method is as shown in FIG. 6, and the following steps are included.

In step 601, the UE executes the temperature measurement.

In step 602, the UE or the base station judges whether the UE has entered the indoor environment. In a case that the UE executes the judgment, the UE uses a built-in thermometer to measure a temperature value of the current environment, and then determines whether it has entered the indoor environment according to a preset rule, for example, the preset rule can be that a current temperature measurement reading and a last temperature reading are compared and a variation amplitude reaches a certain preset value.

In a case that the base station executes the judgment, the UE can send the current temperature measurement value or indication information of whether the UE enters the indoor environment determined according to the current temperature value and the preset rule to the base station, which is used for the base station determining whether the UE enters the indoor environment.

In step 603, if the UE determines whether it has entered the indoor environment, the UE can autonomously trigger to execute horizontal positioning after determining that it has entered the indoor environment; and if the base station judges whether the UE has entered the indoor environment, the base station can trigger the horizontal positioning of the UE, and specifically, the base station can indicate to the UE through an RRC dedicated signaling.

The following methods can be used for the horizontal positioning of the UE:

1) A method based on global navigation satellite positioning (GNSS or A-GNSS).

2) Positioning technologies based on the wireless network, including: an enhanced cell identity (E-CID), an OTDOA (downlink observed time difference of arrival) and a UTDOA (uplink observed time difference of arrival).

In addition, the base station also can acquire the location information of the UE though user input information of the UE, or the base station can acquire the location information of the UE by retrieving the user input information.

In step 604, if the UE or the base station judges that the UE has entered the indoor environment, the base station determines a planimetric location of the UE in combination with network topology information after obtaining horizontal location information of the UE, and determines measurement configuration related information of the UE. Wherein, the network topology information includes: information of cells (frequency points and physical cell identities, etc.) and geographical location information corresponding to the cells, or information of WIFI access points and geographical location information corresponding to the WIFI access points, or D2D network nodes and geographical location information corresponding to the D2D network nodes. Wherein, the base station can obtain the network topology information by means of configuration; or the base station also can obtain the network topology information by means of other UEs reporting adjacency indications. Specifically, the base station can record and make statistics of adjacency indication information reported by the other UEs, and obtain the network topology information in combination with the reported location information of the UE.

The base station can send the measurement configuration related information to the UE through the RRC dedicated signaling (e.g., RRC reconfiguration message). Specifically, the measurement configuration related information includes:

1) Information of one or a plurality of measurement objects, and/or altitude values or barometric pressure values corresponding to the measurement objects. Wherein, the information of the measurement objects includes: standards, frequency points and physical cell identities and so on. Wherein the standards include: CDMA2000, E-UTRAN, UTRAN and GERAN and so on.

2) Or, a start indication of a WIFI function module of the UE, and/or information of a WIFI access point, and/or an altitude value or a barometric pressure value corresponding to the information of the WIFI access point.

3) Or, a start indication of a D2D function module of the UE, and/or D2D related measurement configuration information, and/or an altitude value or a barometric pressure value corresponding to the D2D related measurement configuration information. Wherein, the D2D related measurement configuration information includes: resources sent and/or received when the UE executes D2D discovery or D2D communication, or identifiers, or information related to sequences.

It should be noted that, the base station also can determine that the UE leaves the indoor environment or leaves a specific cell/WIFI access point/D2D network according to the location information or temperature measurement information of the UE, and thus the measurement configuration related information sent to the UE contains a deletion of the measurement objects, or a close indication of the WIFI function module, or a close indication of the D2D function module.

In step 605, the UE determines measurement objects required to be measured according to the measurement configuration related information sent by the base station and an altitude positioning result, and executes a corresponding measurement, or starts a corresponding WIFI function module or D2D function module, or executes a corresponding WIFI related measurement or D2D related measurement, to discover a corresponding cell or a WIFI access point or an adjacent UE. For example, when the measurement configuration related information contains the information of one or a plurality of measurement objects and the altitude values or barometric pressure values corresponding to the measurement objects, the UE determines one or a plurality of measurement objects required to be measured corresponding to the obtained measurement values according to the barometric pressure values or altitude values obtained through measurement by a built-in barometer or barometric altimeter or gyroscope-based altimeter and the measurement configuration related information, and then executes the corresponding measurement on the measurement objects required to be measured.

The embodiment 7 of the present invention will be described in combination with the accompanying drawing below.

Figure 7:
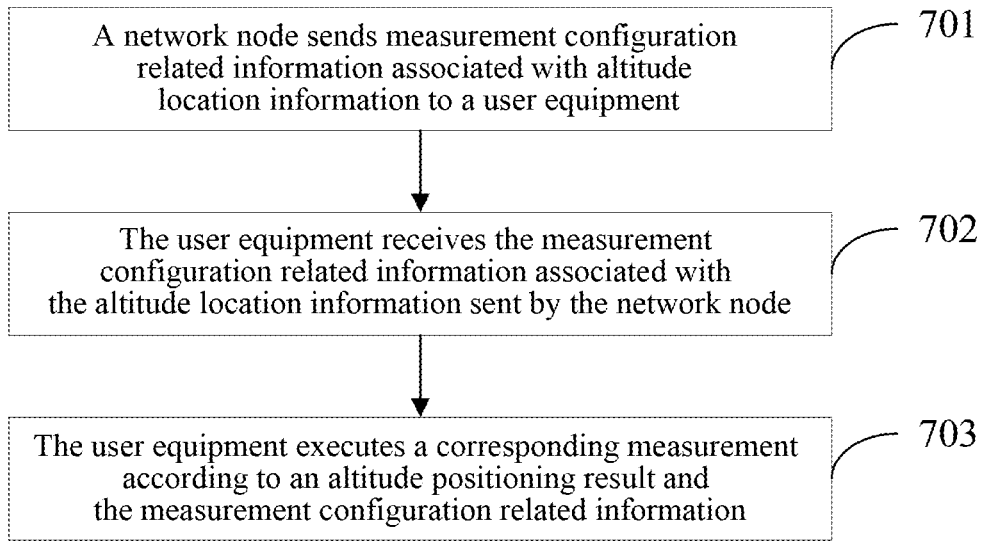
FIG. 7 is a flow chart of a cell discovery method provided in the embodiment 7 of the present invention.

The embodiment of the present invention provides a cell discovery method, and a network node can send measurement configuration related information associated with altitude location information to a user equipment without obtaining location information of the user equipment. The flow of completing the measurement with the method is as shown in FIG. 7, and the following steps are included.

In step 701, the network node sends the measurement configuration related information associated with the altitude location information to the user equipment.

In the step, the network node is not required to acquire location information of a user, that is, the measurement configuration related information is sent to the user equipment.

The measurement configuration related information associated with the altitude location information includes any one of the following groups of information:

a fourth group of information: information of one or a plurality of measurement objects and condition information of triggering a measurement on the measurement objects, a fifth group of information: a start indication of a WIFI function module of the user equipment, and/or information of a WIFI access point, and condition information of triggering a start of the WIFI function module and a measurement on the WIFI access point, a sixth group of information: a start indication of a D2D function module of the user equipment, and/or D2D related measurement configuration information, and condition information of triggering a start of the D2D function module and a measurement related to D2D.

Wherein, the D2D related measurement configuration information includes:

resources sent and/or received when the user equipment executes D2D discovery or D2D communication, or identifiers, or information related to sequences.

Wherein, the condition information includes:

a value range of barometric pressure values or altitude values, or, a threshold value of barometric pressure values or altitude values.

The specific implementation way of the step includes:

the network node sending the measurement configuration related information associated with the altitude location information to the user equipment according to network topology information within a coverage scope of the network node; or, the network node sending the measurement configuration related information associated with the altitude location information to the user equipment according to the network topology information within the coverage scope of the network node and customary information associated with the user equipment; or, the network node sending the measurement configuration related information associated with the altitude location information to the user equipment according to horizontal location information of the user equipment and the network topology information within the coverage scope of the network node;

wherein, the network topology information at least includes: information of cells within the coverage scope of the network node or information of WIFI access points within the coverage scope of the network node or information of D2D network nodes within the coverage scope of the network node, and geographical location information of the cells or geographical location information of the WIFI access points or geographical location information of the D2D network nodes, the customary information associated with the user equipment is information of a cell or WIFI access point which the user equipment once accessed repeatedly, or information of a cell or WIFI access point which the user equipment is inclined to access, or information of a specific cell or WIFI access point set by a user, or WIFI or D2D tendency information according to statistics or set by the user.

In step 702, the user equipment receives the measurement configuration related information associated with the altitude location information sent by the network node.

In step 703, the user equipment executes a corresponding measurement according to an altitude positioning result and the measurement configuration related information.

The step is specifically as follows:

1. The user equipment using a built-in barometer or barometric altimeter or gyroscope-based altimeter to execute altitude positioning; and 2. When determining that the altitude positioning result meets a condition of triggering a measurement on measurement objects in the measurement configuration related information, or a start or measurement related to WIFI or D2D, the user equipment executing a measurement on one or a plurality of measurement objects in the measurement configuration related information or executing a corresponding WIFI measurement or a corresponding D2D measurement, or starting a WIFI related function module or a D2D related function module.

The embodiment 8 of the present invention will be described in combination with the accompanying drawing below.

Figure 8:
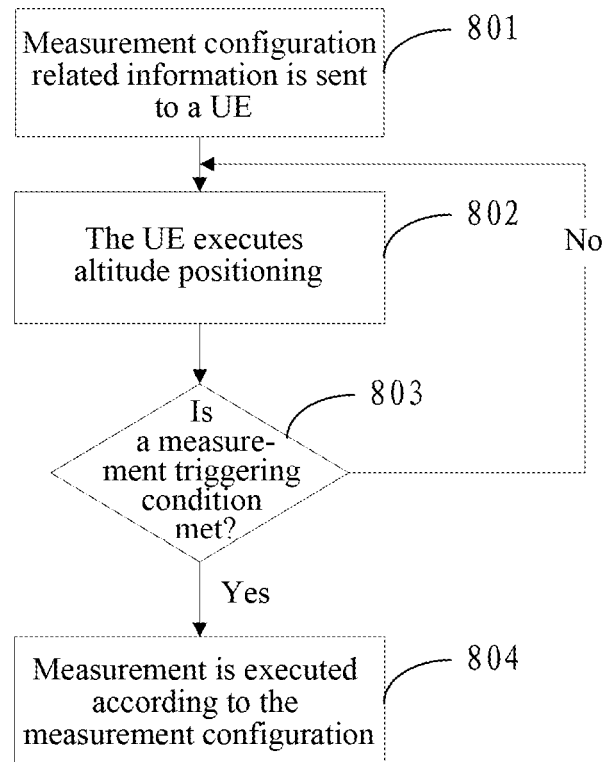
FIG. 8 is a flow chart of a cell discovery method provided in the embodiment 8 of the present invention.

The embodiment of the present invention provides a cell discovery method, and descriptions will be made with an example of taking a base station as a network node and a UE as a user equipment. In the technical scheme provided in the embodiment of the present invention, the base station is not required to obtain location information of the UE but configure measurement configuration related information associated with altitude location information for the UE, and the flow of controlling the UE to complete the measurement with the method is as shown in FIG. 8, and the following steps are included.

In step 801, the base station sends the measurement configuration related information associated with the altitude location information to the UE. Wherein, the measurement configuration related information associated with the altitude location information includes:

1) Information of one or a plurality of measurement objects and condition information of triggering a measurement on the measurement objects.

2) Or, a start indication of a WIFI function module of the UE, and/or information of a WIFI access point, and corresponding condition information of triggering a measurement on the WIFI access point.

3) Or, a start indication of a D2D function module of the UE, and/or D2D related measurement configuration information, and corresponding condition information of triggering a measurement related to D2D. Furthermore, the D2D related measurement configuration information includes: resources sent and/or received when the UE executes D2D discovery or D2D communication, or identifiers, or information related to sequences.

Wherein the triggering condition information is a value range of barometric pressure values or altitude values; or a threshold value of barometric pressure values or altitude values.

Specifically, the base station can send the measurement configuration related information associated with the altitude location information to the UE according to network topology information within a coverage scope of the base station. Wherein, the network topology information includes: information of cells (frequency points and physical cell identities, etc.) and geographical location information corresponding to the cells, or information of WIFI access points and geographical location information corresponding to the WIFI access points, or D2D network nodes and geographical location information corresponding to the D2D network nodes. Wherein, the base station can obtain the network topology information by means of configuration; or the base station also can obtain the network topology information by means of other UEs reporting adjacency indications. Specifically, the base station can record and make statistics of adjacency indication information reported by the other UEs, and obtain the network topology information in combination with the reported location information of the UE.

Or, the base station also sends the measurement configuration related information associated with the altitude location information to the UE according to the network topology information within the coverage scope of the base station and customary information associated with the UE. Wherein, the customary information associated with the UE is information of a cell or WIFI access point which the UE once accessed repeatedly, or information of a cell or WIFI access point which the UE is inclined to access, or information of a specific cell or WIFI access point set by a user, or WIFI or D2D tendency information according to statistics or set by the user.

In step 802, the UE uses a built-in barometer or barometric altimeter or gyroscope-based altimeter to measure a current barometric pressure value to execute altitude positioning.

In step 803, after executing the altitude positioning, the UE judges whether an altitude positioning result meets a measurement triggering condition associated with the altitude location information in the measurement configuration related information. If the measurement triggering condition is met, step 804 is executed, and if the measurement triggering condition is not met, the step 802 is executed.

In step 804, if the UE determines that the altitude positioning result meets the measurement triggering condition in the measurement configuration related information associated with the altitude location information, it is to execute a corresponding measurement on one or a plurality of measurement objects corresponding to the measurement triggering condition or execute a corresponding WIFI measurement or D2D measurement, or start a WIFI related function module or D2D related function module, to discover a corresponding cell or a WIFI access point or an adjacent UE.

The embodiment 9 of the present invention will be described in combination with the accompanying drawing below.

Figure 9:
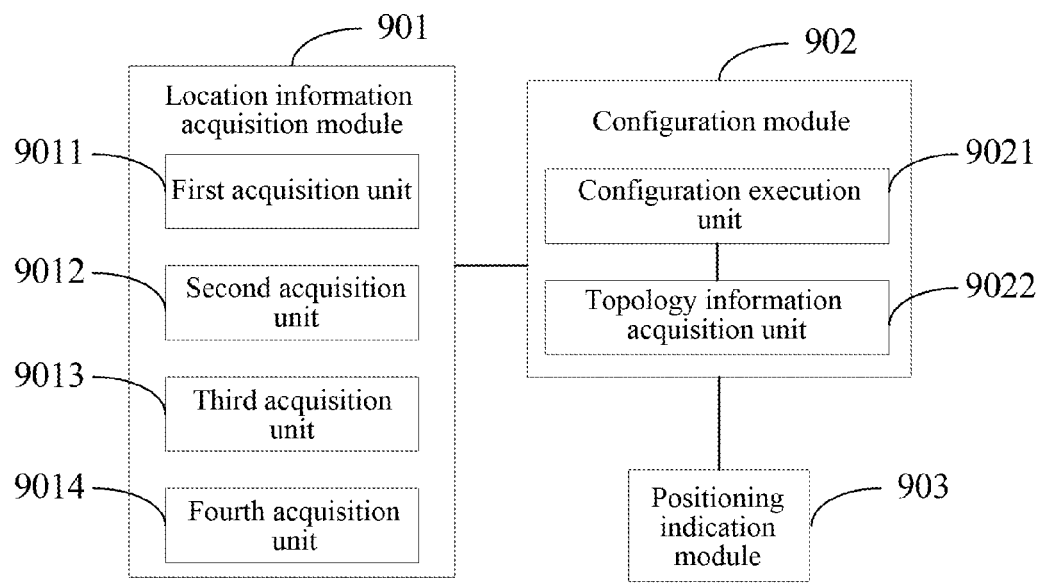
FIG. 9 is a schematic diagram of a structure of a cell discovery device provided in the embodiment 9 of the present invention.

The embodiment of the present invention provides a cell discovery device, and the structure of the cell discovery device is as shown in FIG. 9, which includes:

a location information acquisition module 901, used to: acquire location information containing altitude information of a user equipment; and a configuration module 902, used to: send measurement configuration related information to the user equipment according to the location information of the user equipment, and instruct the user equipment to execute a corresponding measurement according to the measurement configuration related information.

Preferably, the location information acquisition module 901 includes:

a first acquisition unit 9011, used to: voluntarily acquire the location information of the user equipment;

a second acquisition unit 9012, used to: acquire the location information of the user equipment through information reported by the user equipment;

a third acquisition unit 9013, used to: acquire the location information of the user equipment through user input information of the user equipment; and a fourth acquisition unit 9014, used to: acquire the location information of the user equipment by retrieving the user input information of the user equipment.

Preferably, the device also includes:

a positioning indication module 903, used to: instruct the user equipment to execute altitude positioning through an RRC dedicated signaling.

Preferably, the device also includes:

an environment decision module 904, used to: determine that the user equipment has entered an indoor environment by means of:

receiving a current temperature value sent by the user equipment or indication information of whether the user equipment has entered the indoor environment determined according to the current temperature value and a preset rule, and according to the current temperature value sent by the user equipment or the indication information or horizontal location information of the user equipment, deciding whether the user equipment has entered the indoor environment.

Preferably, the positioning indication module 903 is also used to: after the environment decision module determines that the user equipment has entered the indoor environment, indicate to the user equipment that the user equipment has entered the indoor environment through the RRC dedicated signaling.

Preferably, the configuration module 902 includes:

a configuration execution unit 9021, sending the measurement configuration related information to the user equipment according to the location information of the user equipment and network topology information within a coverage scope of the network node, wherein the network topology information includes:

information of cells within the coverage scope of the network node and geographical location information of the cells, or, information of WIFI access points within the coverage scope of the network node and geographical location information of the WIFI access points, or, information of D2D network nodes within the coverage scope of the network node and geographical location information of the D2D network nodes.

Preferably, the configuration module 902 also includes:

a topology information acquisition unit 9022, used to: obtain the network topology information within the coverage scope by means of:

obtaining the network topology information by means of configuration; or, obtaining the network topology information through adjacency indications reported by user equipments in combination with executing the reported location information of the user equipment.

The cell discovery device shown in the FIG. 9 can be integrated in a network node, and the network node completes the corresponding functions.

Figure 10:
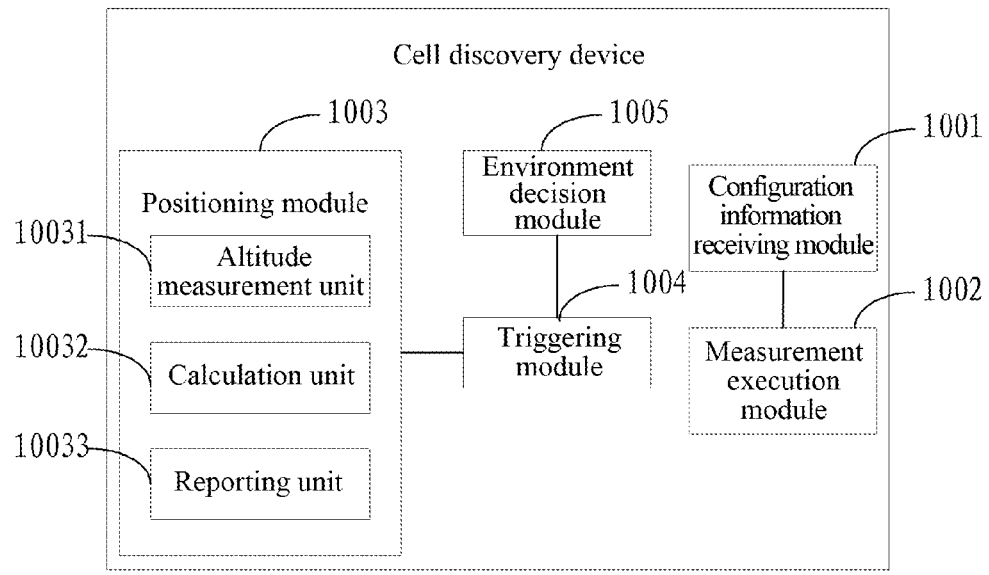
FIG. 10 is another schematic diagram of a structure of a cell discovery device provided in the embodiment 9 of the present invention.

Corresponding to the FIG. 9, the embodiment of the present invention also provides another cell discovery device, and the structure of the cell discovery device is as shown in FIG. 10, which includes:

a configuration information receiving module 1001, used to:

receive measurement configuration related information sent by a network node according to location information containing altitude information of a user equipment; and a measurement execution module 1002, used to: execute a corresponding measurement according to the measurement configuration related information.

Preferably, the device also includes a positioning module 1003, wherein the positioning module 1003 includes:

an altitude measurement unit 10031, used to: perform measurement of altitude positioning, and specifically use a built-in barometer or barometric altimeter of the user equipment to perform the barometric pressure measurement to obtain a barometric pressure measurement value;

a calculation unit 10032, used to: perform calibration on the barometric pressure measurement value according to obtained calibration data to obtain an altitude value corresponding to the barometric pressure measurement value; and a reporting unit 10033, used to: take the altitude value as altitude location information, and report the altitude location information to the network node.

Preferably, the reporting unit 10033 is also used to: take the barometric pressure measurement value as altitude location information and report the altitude location information to the network node, so that the network node performs calibration on the barometric pressure measurement value according to local calibration data to obtain an altitude value corresponding to the barometric pressure measurement value.

Preferably, the device also includes:

a triggering module 1004, used to: autonomously trigger the positioning module 1001 to execute the altitude positioning on the user equipment; or, receive an indication sent by the network node through an RRC dedicated signaling, and trigger the positioning module 1001 to execute the altitude positioning according to the indication.

Preferably, the triggering module 1004 is also used to: trigger the measurement of altitude positioning and/or reporting of altitude positioning information of the user equipment when a triggering event is detected, wherein the triggering event includes that the user equipment has entered an indoor environment, the altitude positioning information includes the barometric pressure measurement value and/or the altitude value, and the triggering event includes:

a variation amplitude compared between a current barometric pressure measurement value and a last barometric pressure measurement value or between a current altitude measurement value and a last altitude measurement value reaching a preset value;

or, a current barometric pressure measurement value being within a range of preset barometric pressure values or a current altitude measurement value being within a range of preset altitude values.

Preferably, the device also includes:

an environment decision module 1005, used to: determine that the user equipment has entered the indoor environment by means of:

using a built-in thermometer of the user equipment to perform measurement to obtain a current temperature value, and then determining whether the user equipment has entered the indoor environment according to a preset rule; or, determining whether the user equipment has entered the indoor environment according to horizontal location information of the user equipment.

Preferably, the triggering module 1004 is also used to: trigger the positioning module to execute the horizontal positioning on the user equipment based on an event that the user equipment has entered the indoor environment;

the positioning module also includes a horizontal positioning unit, used to: execute the horizontal positioning on the user equipment.

The cell discovery device shown in the FIG. 10 can be integrated in a user equipment, and the user equipment completes the corresponding functions.

The embodiment 10 of the present invention will be described in combination with the accompanying drawing below.

Figure 11:
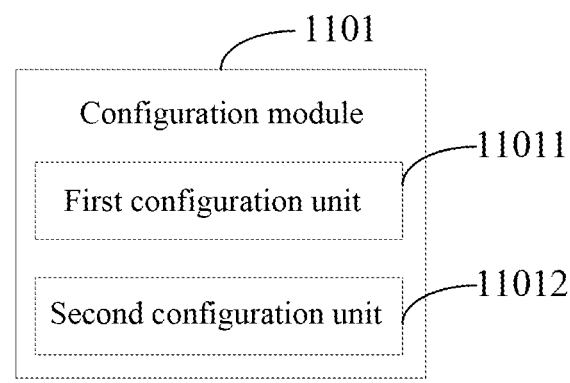
FIG. 11 is a schematic diagram of a structure of a cell discovery device provided in the embodiment 10 of the present invention.

The embodiment of the present invention provides a cell discovery device, and the structure of the cell discovery device is as shown in FIG. 11, which includes:

a configuration module 1101, used to: send measurement configuration related information associated with altitude location information to a user equipment, and instruct the user equipment to execute a corresponding measurement according to an altitude positioning result and the measurement configuration related information.

Preferably, the configuration information sending module 1101 includes:

a first configuration unit 11011, used to: send the measurement configuration related information associated with the altitude location information to the user equipment according to network topology information within a coverage scope of a network node;

a second configuration unit 11012, used to: send the measurement configuration related information associated with the altitude location information to the user equipment according to the network topology information within the coverage scope of the network node and customary information associated with the user equipment;

wherein the network topology information at least includes: information of cells within the coverage scope of the network node or information of WIFI access points within the coverage scope of the network node or information of D2D network nodes within the coverage scope of the network node, and geographical location information of the cells or geographical location information of the WIFI access points or geographical location information of the D2D network nodes, the customary information associated with the user equipment is information of a cell or WIFI access point which the user equipment once accessed repeatedly, or information of a cell or WIFI access point which the user equipment is inclined to access, or information of a specific cell or WIFI access point set by a user, or WIFI or D2D tendency information according to statistics or set by the user.

The cell discovery device shown in the FIG. 11 can be integrated in a network node, and the network node completes the corresponding functions.

Figure 12:
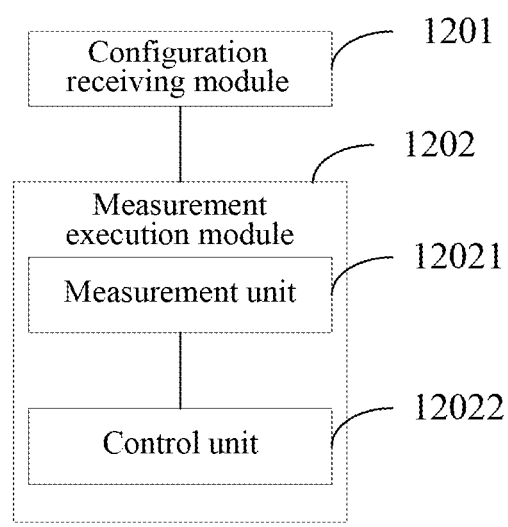
FIG. 12 is another schematic diagram of a structure of a cell discovery device provided in the embodiment 10 of the present invention.

Corresponding to the cell discovery device shown in the FIG. 11, the embodiment of the present invention also provides another cell discovery device, and the structure of the cell discovery device is as shown in FIG. 12, which includes:

a configuration receiving module 1201, used to: receive measurement configuration related information associated with altitude location information sent by a network node; and a measurement execution module 1202, used to: execute a corresponding measurement according to an altitude positioning result and the measurement configuration related information.

Preferably, the measurement execution module 1202 includes:

a measurement unit 12021, using a built-in barometer or barometric altimeter of a user equipment to execute altitude positioning; and a control unit 12022, used to: when determining that the altitude positioning result meets a condition of triggering a measurement on measurement objects in the measurement configuration related information or a start or measurement related to WIFI or D2D, execute a measurement on one or a plurality of measurement objects in the measurement configuration related information or execute a corresponding WIFI measurement or a corresponding D2D measurement, or start a WIFI related function module of the user equipment or a D2D related function module of the user equipment.

The ordinary person skilled in the art can understand that all or part of steps of the above embodiments can be implemented by using a flow of computer program, the computer program can be stored in a computer readable memory medium, the computer program is executed on corresponding hardware platforms (such as a system, equipment, device and component and so on), and when the program is carried out, one of the steps or a combination of the steps of the method embodiments is comprised.

Alternatively, all or part of the steps of the above embodiments also can be implemented by using integrated circuits, these steps can be made into a plurality of integrated circuit modules respectively or a plurality of modules or steps of them can be made into a single integrated circuit module to be implemented. Therefore, the patent document is not limited to any combination of hardware and software in a specific form.

The devices or function modules or function units in the above embodiments can be implemented through a universal calculating device, and they can be concentrated on a single calculating device or distributed in a network consisting of a plurality of calculating devices.

If implemented in a form of software function module and sold or used as an independent product, the devices or function modules or function units in the above embodiments can be stored in a computer readable memory medium. The computer readable memory medium mentioned above can be a read-only memory, disk or optical disk and so on.

Any skilled people familiar to the art can easily conceive changes or substitutions within the technical scope disclosed by the patent document, and these changes and substitutions shall be all covered within the protection scope of the patent document. Therefore, the protection scope of the patent document should be subject to the protection scope described in the claims.

INDUSTRIAL APPLICABILITY

The embodiments of the present invention provide a cell discovery method and device, a network node sends measurement configuration related information to a UE, and then the UE executes a corresponding measurement according to the measurement configuration related information, which implements convenient and efficient small cell discovery, and solves a problem that the small cell discovery process is not timely triggered and the power consumption is greater.

What is claimed is:

1. A cell discovery method, comprising:
a network node acquiring location information containing altitude information of a user equipment; and
the network node sending measurement configuration related information to the user equipment according to the location information of the user equipment, and instructing the user equipment to execute a corresponding measurement according to the measurement configuration related information;
wherein the network node sending the measurement configuration related information to the user equipment according to the location information of the user equipment comprises:
the network node sending the measurement configuration related information to the user equipment according to the location information of the user equipment and network topology information within a coverage scope of the network node, wherein the network topology information comprises:
information of cells within the coverage scope of the network node and geographical location information of the cells, or,
information of WIFI access points within the coverage scope of the network node and geographical location information of the WIFI access points, or,
information of D2D network nodes within the coverage scope of the network node and geographical location information of the D2D network nodes.

2. The cell discovery method according to claim 1, wherein,
the network node acquiring the location information containing the altitude information of the user equipment comprises:
the network node voluntarily acquiring the location information of the user equipment; or,
the network node acquiring the location information of the user equipment through information reported by the user equipment; or,
the network node acquiring the location information of the user equipment through user input information of the user equipment; or,
the network node acquiring the location information of the user equipment by retrieving the user input information of the user equipment,
preferably, before the step of the network node acquiring the location information containing the altitude information of the user equipment, further comprising:
the network node instructing the user equipment to execute altitude positioning through an RRC dedicated signaling.

3. The cell discovery method according to claim 1, further comprising:
the network node determining that the user equipment has entered an indoor environment by means of:
the network node receiving a current temperature value sent by the user equipment or indication information of whether the user equipment has entered the indoor environment determined according to the current temperature value and a preset rule; and
according to the current temperature value sent by the user equipment or the indication information or horizontal location information of the user equipment, the network node deciding whether the user equipment has entered the indoor environment,
preferably, after determining that the user equipment enters the indoor environment, the network node indicating to the user equipment that the user equipment has entered the indoor environment through the RRC dedicated signaling,
more preferably, the network node triggering to execute horizontal positioning on the user equipment based on an event that the user equipment has entered the indoor environment.

4. The cell discovery method according to claim 1, wherein the network node obtains the network topology information within the coverage scope by means of:
the network node obtaining the network topology information by means of configuration; or,
the network node obtaining the network topology information through adjacency indications reported by user equipments in combination with the location information of the user equipments which perform the reporting.

5. The cell discovery method according to claim 4, wherein the network node sending the measurement configuration related information to the user equipment according to the location information of the user equipment and the network topology information within the coverage scope of the network node is:
the network node sending the measurement configuration related information to the user equipment comprehensively according to the horizontal location information and altitude location information of the user equipment, wherein the measurement configuration related information contains any one of the following groups of information:
a first group of information: information of one or a plurality of measurement objects, or,
a second group of information: a start indication of a WIFI function module of the user equipment, and/or information of a WIFI access point, or,
a third group of information: a start indication of a D2D function module of the user equipment, and/or D2D related measurement configuration information,
preferably, the D2D related measurement configuration information comprises: resources sent and/or received when the user equipment executes D2D discovery or D2D communication, or identifiers, or information related to sequences;

or the information of the measurement objects comprises:

information of standards required to be measured, wherein the standards comprise: CDMA2000, E-UTRAN, UTRAN and GERAN, and/or, information of frequency points required to be measured, and/or, information of cells on the frequency points required to be measured, wherein the information of cells comprises physical cell identity information of the cells.

6. A cell discovery method, comprising:

a user equipment receiving measurement configuration related information sent by a network node according to location information containing altitude information of the user equipment; and the user equipment executing a corresponding measurement according to the measurement configuration related information;

wherein the network node sending the measurement configuration related information to the user equipment according to the location information of the user equipment comprises:

the network node sending the measurement configuration related information to the user equipment according to the location information of the user equipment and network topology information within a coverage scope of the network node, wherein the network topology information comprises:

information of cells within the coverage scope of the network node and geographical location information of the cells, or, information of WIFI access points within the coverage scope of the network node and geographical location information of the WIFI access points, or, information of D2D network nodes within the coverage scope of the network node and geographical location information of the D2D network nodes.

7. The cell discovery method according to claim 6, before the step of the user equipment receiving the measurement configuration related information sent by the network node according to the location information containing the altitude information of the user equipment, further comprising:

the user equipment performing a measurement of altitude positioning, and specifically using a built-in barometer or barometric altimeter of the user equipment to perform barometric pressure measurement to obtain a barometric pressure measurement value;

the user equipment performing calibration on the barometric pressure measurement value according to obtained calibration data to obtain an altitude value corresponding to the barometric pressure measurement value; and the user equipment taking the altitude value as altitude location information, and reporting the altitude location information to the network node.

8. The cell discovery method according to claim 6, before the step of the user equipment receiving the measurement configuration related information sent by the network node according to the location information of the user equipment, further comprising:

the user equipment performing a measurement of altitude positioning, and specifically using a built-in barometer or barometric altimeter of the user equipment to perform barometric pressure measurement to obtain a barometric pressure measurement value; and the user equipment taking the barometric pressure measurement value as altitude location information and reporting the altitude location information to the network node, so that the network node performs calibration on the barometric pressure measurement value according to local calibration data to obtain an altitude value corresponding to the barometric pressure measurement value.

9. The cell discovery method according to claim 7, before the step of the user equipment performing the measurement of altitude positioning, further comprising:

the user equipment autonomously triggering to execute altitude positioning on the user equipment; or, the user equipment receiving an indication sent by the network node through an RRC dedicated signaling, and triggering to execute the altitude positioning.

10. The cell discovery method according to claim 9, wherein, a triggering event of triggering the measurement of altitude positioning and/or reporting of altitude positioning information of the user equipment comprises that the user equipment has entered an indoor environment, and the altitude positioning information comprises the barometric pressure measurement value and/or the altitude value.

11. The cell discovery method according to claim 10, wherein, the triggering event of triggering the reporting of the altitude positioning information of the user equipment comprises:

a variation amplitude compared between a current barometric pressure measurement value and a last barometric pressure measurement value or between a current altitude measurement value and a last altitude measurement value reaching a preset value;

or, a current barometric pressure measurement value being within a range of preset barometric pressure values or a current altitude measurement value being within a range of preset altitude values;

or further comprising:

the user equipment determining that the user equipment has entered the indoor environment by means of:

the user equipment using a built-in thermometer to perform measurement to obtain a current temperature value, and then determining whether the user equipment has entered the indoor environment according to a preset rule; or, the user equipment determining whether the user equipment has entered the indoor environment according to horizontal location information of the user equipment, preferably, the user equipment triggering to execute horizontal positioning on the user equipment based on an event that the user equipment has entered the indoor environment.

12. A cell discovery method, comprising:

a network node sending measurement configuration related information associated with altitude location information to a user equipment, and instructing the user equipment to execute a corresponding measurement according to an altitude positioning result and the measurement configuration related information;

wherein, the network node sending the measurement configuration related information associated with the altitude location information to the user equipment comprises:

the network node sending the measurement configuration related information associated with the altitude location information to the user equipment according to network topology information within a coverage scope of the network node; or, the network node sending the measurement configuration related information associated with the altitude location information to the user equipment according to the network topology information within the coverage scope of the network node and customary information associated with the user equipment; or, the network node sending the measurement configuration related information associated with the altitude location information to the user equipment according to horizontal location information of the user equipment and the network topology information within the coverage scope of the network node;

wherein the network topology information at least comprises: information of cells within the coverage scope of the network node or information of WIFI access points within the coverage scope of the network node or information of D2D network nodes within the coverage scope of the network node, and geographical location information of the cells or geographical location information of the WIFI access points or geographical location information of the D2D network nodes, the customary information associated with the user equipment is information of a cell or WIFI access point which the user equipment once accessed repeatedly, or information of a cell or WIFI access point which the user equipment is inclined to access, or information of a specific cell or WIFI access point set by a user, or WIFI or D2D tendency information according to statistics or set by the user.

13. The cell discovery method according to claim 12, wherein, the measurement configuration related information associated with the altitude location information comprises any one of the following groups of information:

a fourth group of information: information of one or a plurality of measurement objects and condition information of triggering a measurement on the measurement objects, a fifth group of information: a start indication of a WIFI function module of the user equipment, and/or information of a WIFI access point, and condition information of triggering a start of the WIFI function module and a measurement on the WIFI access point, a sixth group of information: a start indication of a D2D function module of the user equipment, and/or D2D related measurement configuration information, and condition information of triggering a start of the D2D function module and a measurement related to D2D, preferably, the D2D related measurement configuration information comprises:

resources sent and/or received when the user equipment executes D2D discovery or D2D communication, or identifiers, or information related to sequences;

or the condition information comprises:

a value range of barometric pressure values or a value range of altitude values, or, a threshold value of barometric pressure values or a threshold value of altitude values.

14. A cell discovery method, comprising:

a user equipment receiving measurement configuration related information associated with altitude location information sent by a network node; and the user equipment executing a corresponding measurement according to an altitude positioning result and the measurement configuration related information;

wherein, the network node sending the measurement configuration related information associated with the altitude location information to the user equipment comprises:

the network node sending the measurement configuration related information associated with the altitude location information to the user equipment according to network topology information within a coverage scope of the network node; or, the network node sending the measurement configuration related information associated with the altitude location information to the user equipment according to the network topology information within the coverage scope of the network node and customary information associated with the user equipment; or, the network node sending the measurement configuration related information associated with the altitude location information to the user equipment according to horizontal location information of the user equipment and the network topology information within the coverage scope of the network node;

wherein the network topology information at least comprises: information of cells within the coverage scope of the network node or information of WIFI access points within the coverage scope of the network node or information of D2D network nodes within the coverage scope of the network node, and geographical location information of the cells or geographical location information of the WIFI access points or geographical location information of the D2D network nodes, the customary information associated with the user equipment is information of a cell or WIFI access point which the user equipment once accessed repeatedly, or information of a cell or WIFI access point which the user equipment is inclined to access, or information of a specific cell or WIFI access point set by a user, or WIFI or D2D tendency information according to statistics or set by the user.

15. The cell discovery method according to claim 14, wherein, the user equipment executing the corresponding measurement according to the altitude positioning result and the measurement configuration related information comprises:

the user equipment using a built-in barometer or barometric altimeter to execute altitude positioning; and when determining that the altitude positioning result meets a condition of triggering a measurement on measurement objects in the measurement configuration related information, or a start or measurement related to WIFI or D2D, the user equipment executing a measurement on one or a plurality of measurement objects in the measurement configuration related information or executing a corresponding WIFI measurement or a corresponding D2D measurement, or starting a WIFI related function module or a D2D related function module.

16. A cell discovery device, comprising a hardware platform for executing instructions stored in a non-transitory computer readable medium to execute steps in following modules:
- a location information acquisition module, configured to: acquire location information containing altitude information of a user equipment; and
- a configuration module, configured to: send measurement configuration related information to the user equipment according to the location information of the user equipment, and instruct the user equipment to execute a corresponding measurement according to the measurement configuration related information;
- wherein the configuration module comprises:
- a configuration execution unit, configured to: send the measurement configuration related information to the user equipment according to the location information of the user equipment and network topology information within a coverage scope of a network node, wherein the network topology information comprises:
- information of cells within the coverage scope of the network node and geographical location information of the cells, or,
- information of WIFI access points within the coverage scope of the network node and geographical location information of the WIFI access points, or,
- information of D2D network nodes within the coverage scope of the network node and geographical location information of the D2D network nodes.

17. The cell discovery device according to claim 16, wherein,
the location information acquisition module comprises:
- a first acquisition unit, configured to: voluntarily acquire the location information of the user equipment;
- a second acquisition unit, configured to: acquire the location information of the user equipment through information reported by the user equipment;
- a third acquisition unit, configured to: acquire the location information of the user equipment through user input information of the user equipment; and
- a fourth acquisition unit, configured to: acquire the location information of the user equipment by retrieving the user input information of the user equipment.

18. The cell discovery device according to claim 16, wherein the hardware platform, when executing the instructions stored in the non-transitory computer readable medium, further executes steps in following modules:
- a positioning indication module, configured to: instruct the user equipment to execute altitude positioning through an RRC dedicated signaling,
  - preferably, an environment decision module, configured to: determine that the user equipment has entered an indoor environment by means of:
  - receiving a current temperature value sent by the user equipment or indication information of whether the user equipment has entered the indoor environment determined according to the current temperature value and a preset rule, and according to the current temperature value sent by the user equipment or the indication information or horizontal location information of the user equipment, deciding whether the user equipment has entered the indoor environment,
  - more preferably, the positioning indication module is further configured to: after the environment decision module determines that the user equipment has entered the indoor environment, indicate to the user equipment that the user equipment has entered the indoor environment through the RRC dedicated signaling.

19. The cell discovery device according to claim 16, wherein
the configuration module further comprises:
- a topology information acquisition unit, configured to: obtain the network topology information within the coverage scope by means of:
- obtaining the network topology information by means of configuration; or,
- obtaining the network topology information through adjacency indications reported by user equipments in combination with the location information of the user equipments which perform the reporting.

20. A cell discovery device, comprising a hardware platform for executing instructions stored in a non-transitory computer readable medium to execute steps in following modules:
- a configuration information receiving module, configured to: receive measurement configuration related information sent by a network node according to location information containing altitude information of a user equipment; and
- a measurement execution module, configured to: execute a corresponding measurement according to the measurement configuration related information;
- wherein the measurement configuration related information is sent by the network node to the cell discovery device according to the location information of the user equipment and network topology information within a coverage scope of the network node, wherein the network topology information comprises:
- information of cells within the coverage scope of the network node and geographical location information of the cells, or,
- information of WIFI access points within the coverage scope of the network node and geographical location information of the WIFI access points, or,
- information of D2D network nodes within the coverage scope of the network node and geographical location information of the D2D network nodes.

21. The cell discovery device according to claim 20, wherein the hardware platform, when executing the instructions stored in the non-transitory computer readable medium, further executes steps in a positioning module, wherein the positioning module comprises:
- an altitude measurement unit, configured to: perform a measurement of altitude positioning, and specifically use a built-in barometer or barometric altimeter of the user equipment to perform barometric pressure measurement to obtain a barometric pressure measurement value;
- a calculation unit, configured to: perform calibration on the barometric pressure measurement value according to obtained calibration data to obtain an altitude value corresponding to the barometric pressure measurement value; and
- a reporting unit, configured to: take the altitude value as altitude location information, and report the altitude location information to the network node.

22. The cell discovery device according to claim 20, wherein, the hardware platform, when executing the instructions stored in the non-transitory computer readable medium, further executes steps in a positioning module, wherein the positioning module comprises:

an altitude measurement unit, configured to: perform a measurement of altitude positioning, and specifically use a built-in barometer or barometric altimeter of the user equipment to perform barometric pressure measurement to obtain a barometric pressure measurement value; and a reporting unit, configured to: take the barometric pressure measurement value as altitude location information and report the altitude location information to the network node, so that the network node performs calibration on the barometric pressure measurement value according to local calibration data to obtain an altitude value corresponding to the barometric pressure measurement value.

23. The cell discovery device according to claim 21, wherein the hardware platform, when executing the instructions stored in the non-transitory computer readable medium, further executes steps in a triggering module, wherein the triggering module is configured to:

autonomously trigger the positioning module to execute the altitude positioning on the user equipment; or, receive an indication sent by the network node through an RRC dedicated signaling, and trigger the positioning module to execute the altitude positioning according to the indication.

24. The cell discovery device according to claim 23, wherein, the triggering module is further configured to: trigger the measurement of altitude positioning and/or reporting of altitude positioning information of the user equipment when a triggering event is detected, wherein the triggering event comprises that the user equipment has entered an indoor environment, the altitude positioning information comprises the barometric pressure measurement value and/or the altitude value, and the triggering event comprises:

a variation amplitude compared between a current barometric pressure measurement value and a last barometric pressure measurement value or between a current altitude measurement value and a last altitude measurement value reaching a preset value;

or, a current barometric pressure measurement value being within a range of preset barometric pressure values or a current altitude measurement value being within a range of preset altitude values, preferably, the cell discovery device further comprises:

an environment decision module, configured to: determine that the user equipment has entered the indoor environment by means of:

using a built-in thermometer of the user equipment to perform measurement to obtain a current temperature value, and then determining whether the user equipment enters the indoor environment according to a preset rule; or, determining whether the user equipment has entered the indoor environment according to horizontal location information of the user equipment;

or the triggering module is further configured to: trigger the positioning module to execute horizontal positioning on the user equipment based on an event that the user equipment has entered an indoor environment;

the positioning module further comprises a horizontal positioning unit, configured to: execute the horizontal positioning on the user equipment.

25. A cell discovery device, comprising a hardware platform for executing instructions stored in a non-transitory computer readable medium to execute steps in a following module:

a configuration module, configured to: send measurement configuration related information associated with altitude location information to a user equipment, and instruct the user equipment to execute a corresponding measurement according to an altitude positioning result and the measurement configuration related information;

wherein the configuration module is configured to:

send the measurement configuration related information associated with the altitude location information to the user equipment according to network topology information within a coverage scope of a network node; or, send the measurement configuration related information associated with the altitude location information to the user equipment according to the network topology information within the coverage scope of the network node and customary information associated with the user equipment; or, send the measurement configuration related information associated with the altitude location information to the user equipment according to horizontal location information of the user equipment and the network topology information within the coverage scope of the network node;

wherein the network topology information at least comprises: information of cells within the coverage scope of the network node or information of WIFI access points within the coverage scope of the network node or information of D2D network nodes within the coverage scope of the network node, and geographical location information of the cells or geographical location information of the WIFI access points or geographical location information of the D2D network nodes, the customary information associated with the user equipment is information of a cell or WIFI access point which the user equipment once accessed repeatedly, or information of a cell or WIFI access point which the user equipment is inclined to access, or information of a specific cell or WIFI access point set by a user, or WIFI or D2D tendency information according to statistics or set by the user.

26. A cell discovery device, comprising a hardware platform for executing instructions stored in a non-transitory computer readable medium to execute steps in following modules:

a configuration receiving module, configured to: receive measurement configuration related information associated with altitude location information sent by a network node; and a measurement execution module, configured to: execute a corresponding measurement according to an altitude positioning result and the measurement configuration related information;

wherein, the measurement configuration related information associated with the altitude location information is sent by the network node to the cell discovery device according to network topology information within a coverage scope of the network node;

or, the measurement configuration related information associated with the altitude location information is sent by the network node to the cell discovery device according to the network topology information within the coverage scope of the network node and customary information associated with a user equipment; or, the measurement configuration related information associated with the altitude location information is sent by the network node to the cell discovery device according to horizontal location information of the user equipment and the network topology information within the coverage scope of the network node;

wherein the network topology information at least comprises: information of cells within the coverage scope of the network node or information of WIFI access points within the coverage scope of the network node or information of D2D network nodes within the coverage scope of the network node, and geographical location information of the cells or geographical location information of the WIFI access points or geographical location information of the D2D network nodes, the customary information associated with the user equipment is information of a cell or WIFI access point which the user equipment once accessed repeatedly, or information of a cell or WIFI access point which the user equipment is inclined to access, or information of a specific cell or WIFI access point set by a user, or WIFI or D2D tendency information according to statistics or set by the user.

27. The cell discovery device according to claim 26, wherein, the measurement execution module comprises:

a measurement unit, configured to: use a built-in barometer or barometric altimeter of a user equipment to execute altitude positioning; and a control unit, configured to: when determining that the altitude positioning result meets a condition of triggering a measurement on measurement objects in the measurement configuration related information or a start or measurement related to WIFI or D2D, execute a measurement on one or a plurality of measurement objects in the measurement configuration related information or execute a corresponding WIFI measurement or a corresponding D2D measurement, or start a WIFI related function module of the user equipment or a D2D related function module of the user equipment.

* * * * *